(12) United States Patent
Marmur et al.

(10) Patent No.: US 7,192,239 B2
(45) Date of Patent: Mar. 20, 2007

(54) APPARATUS FOR DUAL STAGE LOADING OF A CONTAINER UPON A ROLL-OFF VEHICLE

(75) Inventors: Lazar Marmur, Plainsboro, NJ (US); Gregory Krasnopolskiy, Trenton, NJ (US)

(73) Assignee: Automated Waste Equipment Co., Inc., Trenton, NJ (US)

( * ) Notice: Subject to any disclaimer, the term of this patent is extended or adjusted under 35 U.S.C. 154(b) by 386 days.

(21) Appl. No.: 10/947,744

(22) Filed: Sep. 23, 2004

(65) Prior Publication Data

US 2006/0062659 A1    Mar. 23, 2006

(51) Int. Cl.
B65G 69/22    (2006.01)
(52) U.S. Cl. ................................. 414/478; 414/475
(58) Field of Classification Search ............... 414/473, 414/474, 475, 477, 478, 479, 500, 509; 537/8
See application file for complete search history.

(56) References Cited

U.S. PATENT DOCUMENTS

| | | | |
|---|---|---|---|
| 1,821,327 A | 9/1931 | Scott | |
| 1,885,399 A * | 11/1932 | Wren | 414/479 |
| 2,082,663 A * | 6/1937 | Slater | 414/477 |
| 2,468,502 A * | 4/1949 | Lisota | 414/477 |
| 2,530,350 A | 11/1950 | Ehlert | |
| 2,588,001 A * | 3/1952 | Holland | 414/477 |
| 2,621,814 A | 12/1952 | Lisota | |
| 2,703,658 A | 3/1955 | Bazzell | |
| 2,741,383 A | 4/1956 | Leckert | |
| 3,001,825 A | 9/1961 | Rouse | |
| 3,049,378 A | 8/1962 | Nelson | |
| 3,074,574 A | 1/1963 | Prince | |
| 3,077,278 A | 2/1963 | Alexander | |
| 3,127,041 A * | 3/1964 | Flyn et al. | 414/477 |
| 3,138,276 A | 6/1964 | Allen et al. | |
| 3,144,149 A | 8/1964 | Dempster et al. | |
| 3,195,749 A | 7/1965 | Dempster et al. | |
| 3,214,046 A | 10/1965 | Dempster et al. | |
| 3,231,120 A | 1/1966 | Dempster et al. | |
| 3,272,546 A | 9/1966 | Cooley | |
| 3,302,808 A | 2/1967 | Herach et al. | |
| 3,399,795 A | 9/1968 | Clucker et al. | |
| 3,467,268 A | 9/1969 | Corompt | |
| 3,485,400 A * | 12/1969 | Pewthers | 414/477 |
| 3,514,000 A | 5/1970 | Kolling et al. | |
| 3,572,563 A | 3/1971 | Oliver | |
| 3,606,059 A | 9/1971 | Haberle, Jr. | |
| 3,638,808 A * | 2/1972 | Grey et al. | 414/788.8 |
| 3,638,817 A | 2/1972 | Corompt | |
| 3,648,868 A | 3/1972 | Richler | |
| 3,712,491 A | 1/1973 | Kreutzer | |
| 3,819,075 A | 6/1974 | Derain | |

(Continued)

*Primary Examiner*—Eileen D. Lillis
*Assistant Examiner*—Joshua Rudawitz
(74) *Attorney, Agent, or Firm*—Sperry, Zoda & Kane

(57) ABSTRACT

A two staged system for powering the loading of a container upon a roll-off truck body or trailer utilizing initial movement of a single shoe within the vehicle frame and powering of movement thereof into abutment with respect to second movable shoe each of which includes a sheave about which the powering cable extends. Each shoe member moves through a path which is overlapping such that initially enhanced power and slower movement are provided to the container and during the second or final stage faster movement and less power is applied.

22 Claims, 14 Drawing Sheets

U.S. PATENT DOCUMENTS

| | | | |
|---|---|---|---|
| 3,874,537 A | 4/1975 | Kou |
| 3,892,323 A | 7/1975 | Corompt |
| 3,894,644 A | 7/1975 | Alexander |
| 3,934,740 A | 1/1976 | Rumell |
| 3,964,626 A | 6/1976 | Arregui |
| 3,988,035 A | 10/1976 | Corompt |
| 4,058,231 A | 11/1977 | Visa et al. |
| 4,090,623 A | 5/1978 | Noyon |
| 4,092,755 A | 6/1978 | Hughes |
| 4,109,810 A | 8/1978 | Jones |
| 4,133,439 A | 1/1979 | Goranson |
| 4,175,904 A | 11/1979 | Airaksinen |
| 4,225,280 A | 9/1980 | Brunet et al. |
| 4,344,731 A | 8/1982 | Visa et al. |
| 4,350,469 A | 9/1982 | Corompt |
| 4,352,625 A | 10/1982 | Bolderoff |
| 4,409,903 A | 10/1983 | Wilhelmsson et al. |
| 4,453,878 A | 6/1984 | Paukku |
| 4,455,118 A | 6/1984 | Scharf |
| 4,514,131 A | 4/1985 | Godwin, Sr. |
| 4,529,349 A | 7/1985 | Lutz |
| 4,548,541 A * | 10/1985 | Corompt | 414/479 |
| 4,580,805 A | 4/1986 | Bertolini |
| 4,599,040 A | 7/1986 | Rasmussen |
| 4,645,405 A | 2/1987 | Cambiano |
| 4,704,063 A | 11/1987 | Updike, Jr. et al. |
| 4,755,097 A | 7/1988 | Corompt |
| 4,762,370 A | 8/1988 | Corompt et al. |
| 4,802,811 A | 2/1989 | Nijenhuis |
| 4,836,735 A * | 6/1989 | Dennehy et al. | 414/475 |
| 4,840,532 A * | 6/1989 | Galbreath | 414/479 |
| 4,848,619 A | 7/1989 | Corompt |
| 4,889,464 A | 12/1989 | Self |
| 4,934,898 A | 6/1990 | Galbreath |
| 4,943,203 A | 7/1990 | Bohata |
| 4,954,039 A | 9/1990 | Johnston et al. |
| 4,986,719 A | 1/1991 | Galbreath |
| 5,007,791 A * | 4/1991 | Boughton | 414/494 |
| 5,026,228 A | 6/1991 | Mansfield |
| 5,082,416 A | 1/1992 | Bock |
| 5,088,875 A * | 2/1992 | Galbreath et al. | 414/478 |
| 5,163,800 A | 11/1992 | Raisio |
| 5,183,371 A | 2/1993 | O'Daniel |
| 5,203,668 A | 4/1993 | Marmur |
| 5,213,466 A | 5/1993 | Bubik |
| 5,246,329 A | 9/1993 | Farrell |
| 5,246,330 A | 9/1993 | Marmur et al. |
| 5,324,160 A | 6/1994 | Smith |
| 5,460,473 A | 10/1995 | LaMora et al. |
| 5,509,775 A | 4/1996 | Kendall |
| 5,529,454 A | 6/1996 | Alm et al. |
| 5,542,807 A | 8/1996 | Kruzick |
| 5,562,391 A | 10/1996 | Green |
| 5,580,211 A | 12/1996 | Mengel |
| 5,601,393 A | 2/1997 | Waldschmitt |
| 5,660,446 A | 8/1997 | Weatherly |
| 5,662,453 A | 9/1997 | Gerstner et al. |
| 5,678,978 A | 10/1997 | Markham |
| 5,718,554 A | 2/1998 | McElroy |
| 5,725,350 A | 3/1998 | Christenson |
| 5,779,431 A | 7/1998 | Alm et al. |
| 5,795,124 A | 8/1998 | Kitten et al. |
| 5,807,057 A | 9/1998 | Nijenhuis |
| 5,813,824 A | 9/1998 | Zanzig et al. |
| 5,823,733 A | 10/1998 | Kruzick |
| 5,839,864 A | 11/1998 | Reynard |
| 5,848,869 A * | 12/1998 | Slocum et al. | 414/500 |
| 5,871,328 A | 2/1999 | Pinkston |
| 5,913,561 A | 6/1999 | Alcorn |
| 5,921,742 A | 7/1999 | Gearhart |
| 5,951,235 A | 9/1999 | Young et al. |
| 5,967,733 A | 10/1999 | Cash |
| 5,996,171 A | 12/1999 | Bowers |
| 6,053,692 A * | 4/2000 | Mason et al. | 414/498 |
| 6,068,440 A | 5/2000 | Lang et al. |
| 6,168,371 B1 | 1/2001 | Lesmeister et al. |
| 6,276,890 B1 | 8/2001 | Pratt |
| 6,332,746 B1 | 12/2001 | Lang et al. |
| 6,336,783 B1 | 1/2002 | Young et al. |
| 6,354,787 B1 | 3/2002 | O'Daniel |
| 6,394,734 B1 | 5/2002 | Landoll et al. |
| 6,406,231 B1 | 6/2002 | Landoll et al. |
| 6,406,247 B1 | 6/2002 | Ghiretti et al. |
| 6,419,292 B1 | 7/2002 | Calcote et al. |
| 6,431,577 B1 | 8/2002 | Chapman |
| 6,461,096 B1 | 10/2002 | Mentele et al. |
| 6,511,278 B1 | 1/2003 | Harkcom et al. |
| 6,537,015 B2 | 3/2003 | Lim et al. |
| 6,547,506 B1 | 4/2003 | Jacob |
| 6,558,104 B1 * | 5/2003 | Vlaanderen et al. | 414/498 |
| 6,568,892 B2 | 5/2003 | Landoll et al. |
| 6,589,005 B1 | 7/2003 | Hull |
| 6,962,473 B2 * | 11/2005 | Scranton et al. | 414/475 |

* cited by examiner

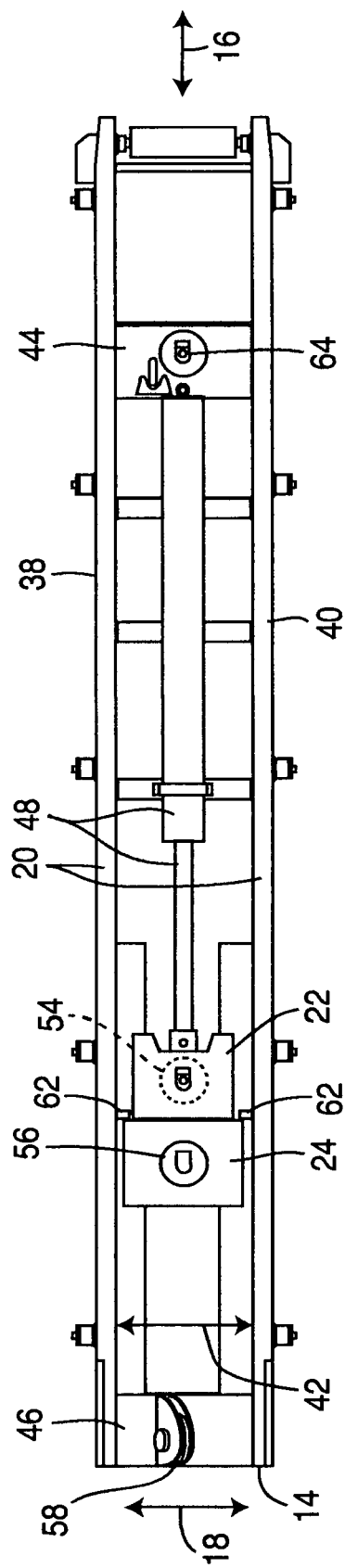
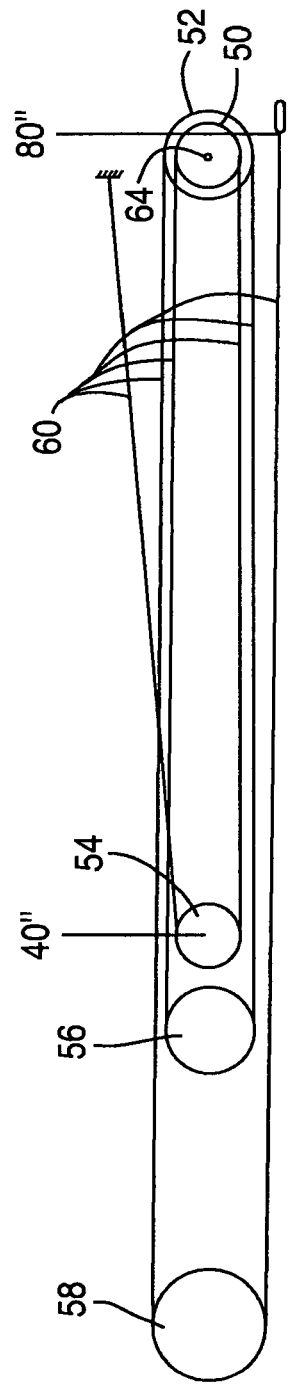
FIG. 3A
FIG. 3B

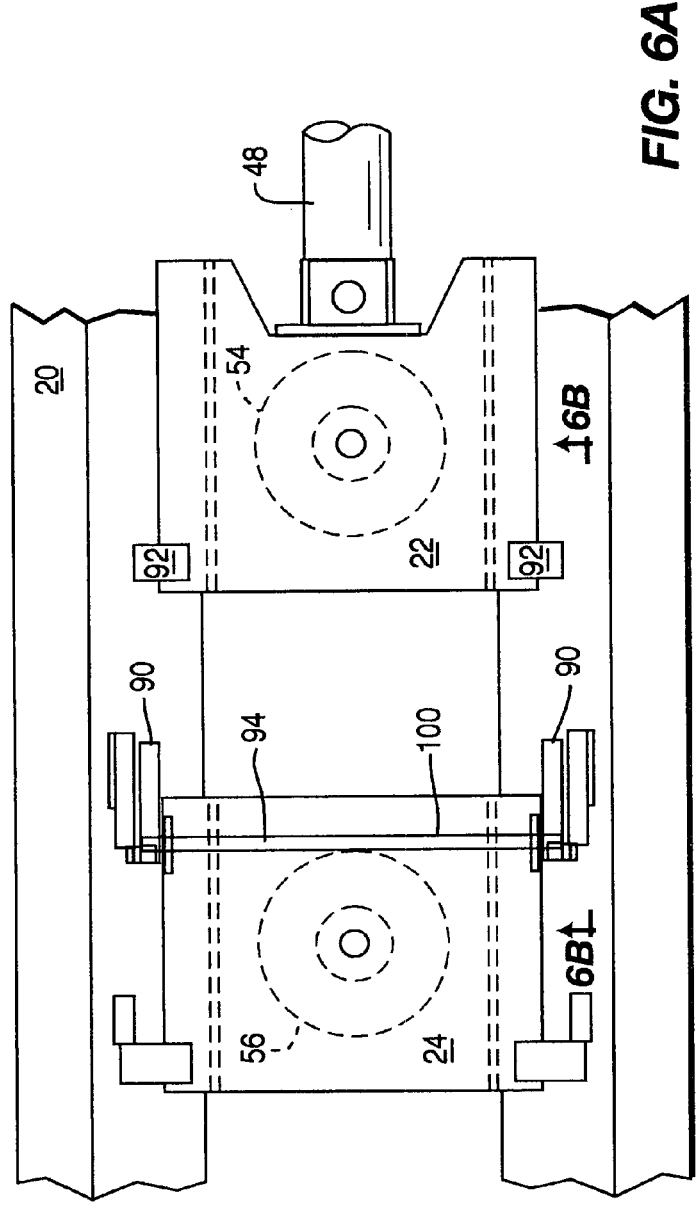
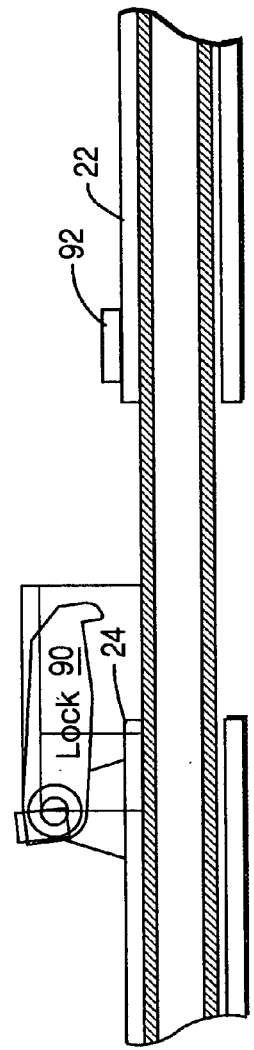
FIG. 6A
FIG. 6B

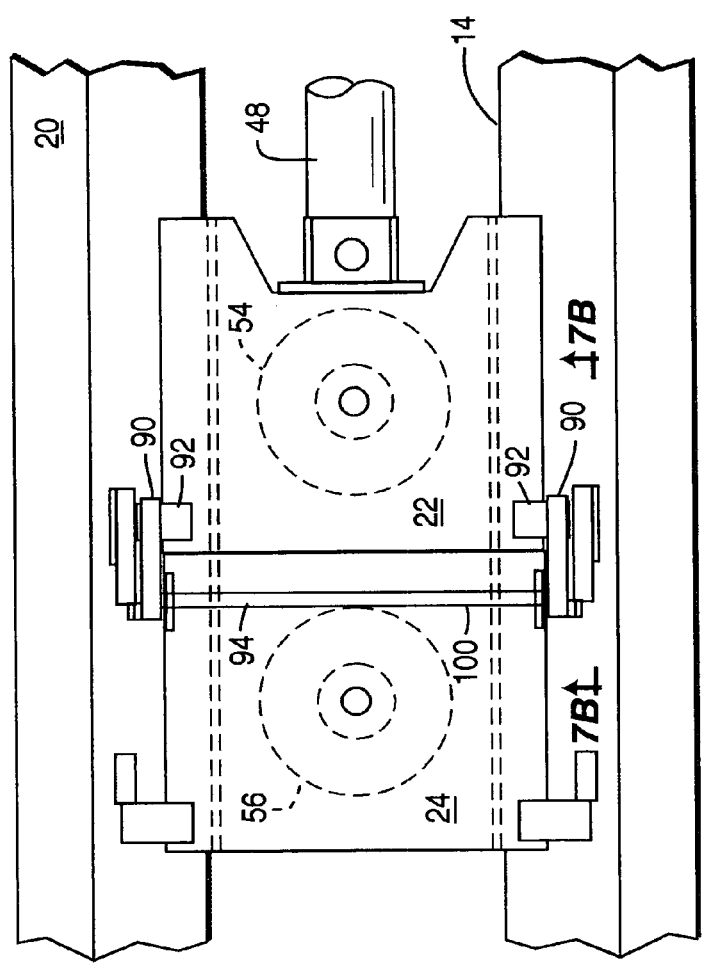
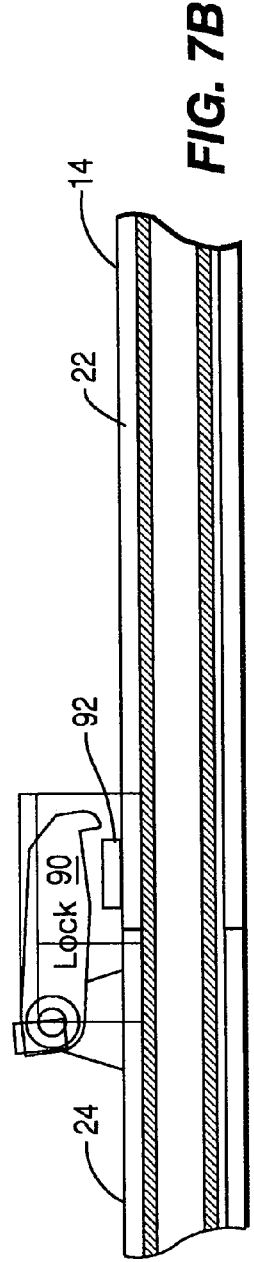
FIG. 7A
FIG. 7B

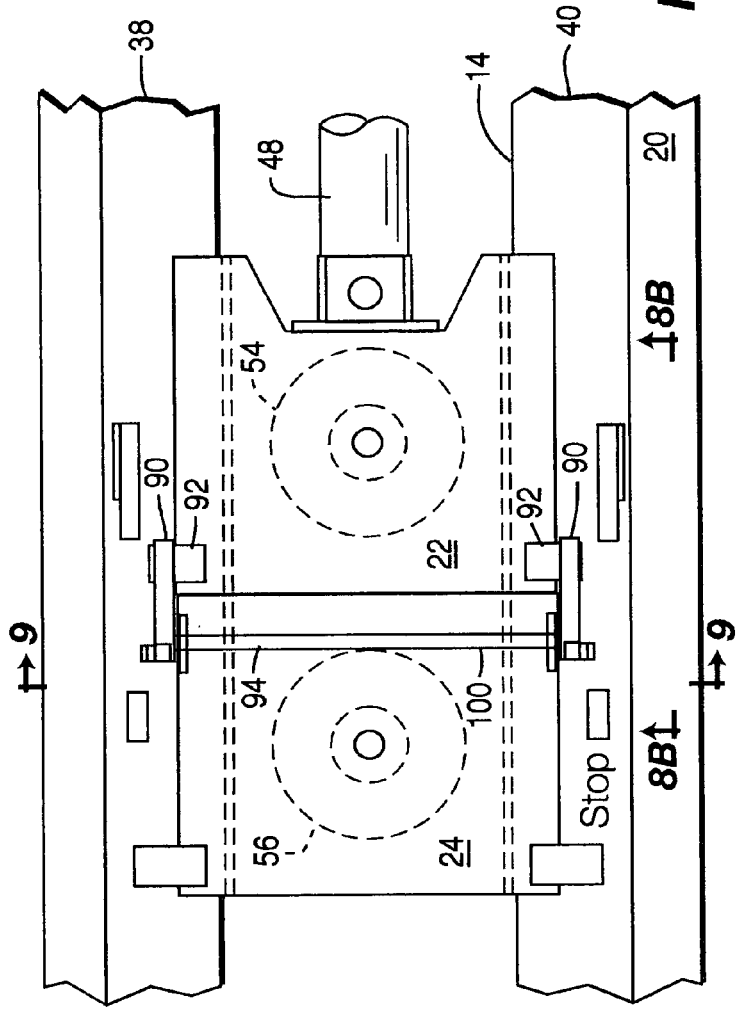
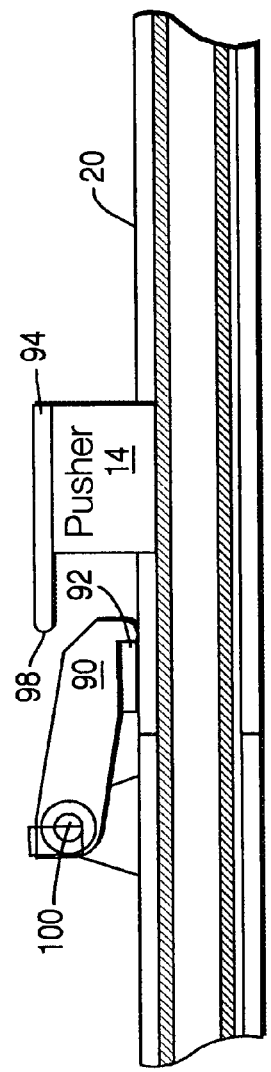
FIG. 8A
FIG. 8B ized or inefficient and the present invention provides
APPARATUS FOR DUAL STAGE LOADING OF A CONTAINER UPON A ROLL-OFF VEHICLE

BACKGROUND OF THE INVENTION

1. Field of the Invention

The present invention deals with the field of devices generally and most commonly referred to as roll-off vehicles. Roll-off vehicles normally comprise trailers or truck bodies which are adapted to receive a large container usually a waste container moved thereupon and removable therefrom. With such designs a cable is normally attached to the container and a winch or powered cylinder mechanism is utilized to draw the container onto the support surface of the roll-off vehicle and to facilitate removal therefrom. In such circumstances it is very helpful to have increased power during the initial stages of movement and to have higher movement speed during the latter stages of movement of the container toward the loaded position upon the roll-off support surface. Prior art attempts to satisfy these two stages of powering needs have been heretofore either inadequate or inefficient and the present invention provides a unique apparatus to provide this powered movement capability.

2. Description of the Prior Art

A number of prior art devices have been utilized for various types of apparatus for facilitating the loading and unloading of containers with respect to roll back vehicles such as truck bodies and trailers. Examples of such patents include U.S. Pat. No. 1,821,327 patented Sep. 1, 1931 to W. P. Scott on an "Automobile Truck"; and U.S. Pat. No. 2,468,502 patented Apr. 26, 1949 to E. Lisota on an "Actuating Device For Sliding Vehicle Beds; and U.S. Pat. No. 2,530,350 patented Nov. 14, 1950 to E. R. Ehlert on an "Unloader For Farm Vehicles" and assigned to Tipton Mfg. Co., Inc.; and U.S. Pat. No. 2,621,814 patented Dec. 16, 1952 to E. Lisota on an "Adjustable Tilting Bed for Trucks; and U.S. Pat. No. 2,703,658 patented Mar. 8, 1955 to C. S. Bazzell on a "Vehicle Convoy or Carrier With Adjustable Ramp"; and U.S. Pat. No. 2,741,383 patented Apr. 10, 1956 to J. T. Leckert on a "Self Unloading Vehicle" and assigned to Amos E. Heath and Robert F. Minton; and U.S. Pat. No. 3,001,825 patented Sep. 26, 1961 to W. D. Rouse on a "Tandem Dumping-Platform Truck"; and U.S. Pat. No. 3,049,378 patented Aug. 14, 1962 to F. E. Nelson on a "Self-Loading And Unloading Vehicle"; and U.S. Pat. No. 3,074,574 patented Jan. 22, 1963 to R. Prince on a "Truck Frame And Retractable Truck Bed"; and U.S. Pat. No. 3,077,278 patented Feb. 12, 1963 to H. G. Alexander on a "Truck Loading Assembly With Detachable Container"; and U.S. Pat. No. 3,138,276 patented Jun. 23, 1964 to D. E. Allen et al on a "Demountable Truck Body"; and U.S. Pat. No. 3,144,149 patented Aug. 11, 1964 to G. R. Dempster et al on a "Transporting Equipment For Containers" and assigned to Dempster Brothers, Inc.; and U.S. Pat. No. 3,195,749 patented Jul. 20, 1965 to J. S. Dempster et al on a "Container Loading and Unloading Mechanism" and assigned to Dempster Brothers, Inc.; and U.S. Pat. No. 3,214,046 patented Oct. 26, 1965 to G. R. Dempster et al on a "Container Handling Mechanism" and assigned to Dempster Brothers, Inc.; and U.S. Pat. No. 3,231,120 patented Jan. 25, 1966 to G. R. Dempster et al on a "Container Loading And Unloading Mechanism" and assigned to Dempster Brothers, Inc.; and U.S. Pat. No. 3,272,546 patented Sep. 13, 1966 to C. R. Cooley on a "Push-Pull Device For Containers" and assigned to Tri-City Industrial Service, Inc.; and U.S. Pat. No. 3,302,808 patented Feb. 7, 1967 to W. A. Herpich et al on a "Container Loading And Unloading Mechanism"; and U.S. Pat. No. 3,399,795 patented Sep. 3, 1968 to R. V. Clucker et al on a "Loading Apparatus For Demountable Vehicle Bodies" and assigned to Harsco Corporation; and U.S. Pat. No. 3,467,268 patented Sep. 16, 1969 to A. Corompt on an "Apparatus For Handling And Transport Of Heavy Bulky Containers" and assigned to Etablissements Bennes Marrel; and U.S. Pat. No. 3,514,000 patented May 26, 1970 to M. C. Kolling et al on "Mobile Trucking Equipment"; and U.S. Pat. No. 3,572,563 patented Mar. 30, 1971 to Emerson T. Oliver on a "Truck Unloader"; and U.S. Pat. No. 3,606,059 patented Sep. 20, 1971 to H. Haberle, Jr. on a "Roll-Off Trailer"; and U.S. Pat. No. 3,638,817 patented Feb. 1, 1972 to Antoine Corompt on a "Container Handling And Transporting Device" and assigned to Bennes Marrel; and U.S. Pat. No. 3,648,868 patented Mar. 14, 1972 to Max M. Richler on a "Container Transporting Vehicle" and assigned to Atlas Hoist & Body Incorporated; and U.S. Pat. No. 3,712,491 patented Jan. 23, 1973 to Thomas P. Kreutzer on a "Dual Purpose Dump And Transport Vehicle" and assigned to L.S.T. Enterprises; and U.S. Pat. No. 3,819,075 patented Jun. 25, 1974 to Christian Derain on a "Device For Loading A Skip On To A Vehicle" and assigned to Societe Nouvelle des Bennes Saphem; and U.S. Pat. No. 3,874,537 patented Apr. 1, 1975 to Jean Kou on a "Road Vehicle Of The Platform Type"; and U.S. Pat. No. 3,892,323 patented Jul. 1, 1975 to Antoine Corompt on a "Container-Handling Device For A Self-Loading Vehicle" and assigned to Bennes Marrel; and U.S. Pat. No. 3,894,644 patented Jul. 15, 1975 to Harold G. Alexander on a "Truck-Mounted Loader"; and U.S. Pat. No. 3,934,740 patented Jan. 27, 1976 to James A. Rumell on a "Transport Vehicle With Tiltable Chassis"; and U.S. Pat. No. 3,964,626 patented Jun. 22, 1976 to Jose Luis Loidi Arregui on a "Truck For Handling Containers" and assigned to Asteko S/A; and U.S. Pat. No. 3,988,035 patented Oct. 26, 1976 to Antoine Corompt on a "Locking Device, In Particular For A Handling Cranked Arm Mounted On A Vehicle" and assigned to Bennes Marrel; and U.S. Pat. No. 4,058,231 patented Nov. 15, 1977 to Heikki Visa et al on an "Apparatus For Moving An Exchangeable Platform Or A Container On To And Off Of A Tipping Frame Of A Lorry, Trailer, Or The Like" and assigned to Autolava Oy; and U.S. Pat. No. 4,090,623 patented May 23, 1978 to Gustave Maurice Noyon on a "System For Handling A Container" and assigned to Societe Internationale d'Investissements et de Participations par abreviation Interpar; and U.S. Pat. No. 4,092,755 patented Jun. 6, 1978 to Gary W. Hughes on a "Highly Versatile Dock Trailer"; and U.S. Pat. No. 4,109,810 patented Aug. 29, 1978 to Eldon D. Jones on an "Apparatus For Mounting And Demounting A Vehicle Body"; and U.S. Pat. No. 4,133,439 patented Jan. 9, 1979 to Paul I. Goranson on a "Vehicle Body Loading And Unloading Mechanism" and assigned to Carrier Corporation; and U.S. Pat. No. 4,175,904 patented Nov. 27, 1979 to Markkn Airaksinen on an "Apparatus For Mounting, Demounting, and Tipping Vehicles" and assigned to Multilift Oy; and U.S. Pat. No. 4,225,280 patented Sep. 30, 1980 to Roger Brunet et al on a "Trailer For Transporting And Launching Floating Box Caissons" and assigned to Constructions Navales et Industrielles de la Mediterranee; and U.S. Pat. No. 4,344,731 patented Aug. 17, 1982 to Heikki Visa on "Equipment For Raising An Exchange Platform Or Container To A Horizontal Position Above The Level Of The Transport Position" and assigned to Oy Partek AB; and U.S. Pat. No. 4,350,469 patented Sep. 21, 1982 to Antoine Corompt on a "Handling Device Mounted On A Vehicle To Carry Out The Handling Of Loads Such As Skips And Containers" and assigned to Bennes Marrel S.A.; and U.S. Pat. No. 4,352,625 patented Oct. 5, 1982 to Jack Bolderoff on a "Container Handling Apparatus"; and U.S. Pat. No. 4,409,903 patented Oct. 18, 1983 to Tore C. Wilhelmsson et al on a "Transportation Apparatus"; and U.S. Pat. No. 4,453,878 patented Jun. 12, 1984 to Teuvo Paukku on a "Lock Device For Loading Equipment" and assigned to OY Partek AB; and U.S. Pat. No. 4,455,118 patented Jun. 19, 1984 to Heino W. Scharf on an "Opposed Cylinder Cable Hoist Mechanism" and assigned to Dempster Systems Inc.; and U.S. Pat. No. 4,514,131 patented Apr. 30, 1985 to James P. Godwin, Sr. on an "Automatic Self-Locking Roll Back Carrier For A Vehicle"; and U.S. Pat. No. 4,529,349 patented Jul. 16, 1985 to Theodore A. Lutz on a "Roll-Off Hoist"; and U.S. Pat. No. 4,580,805 patented Apr. 8, 1986 to William A. Bertolini on an "Extendable Container Chassis For Trucks" and assigned to Titan, Inc.; and U.S. Pat. No. 4,548,541 patented Oct. 22, 1985 to Antoine Corompt on a "Method And Apparatus For Unloading A Piece of Equipment Placed On A Carrying Vehicle" and assigned to Bennes Marrel; and U.S. Pat. No. 4,599,040 patented Jul. 8, 1986 to Robert Rasmussen on a "Method For Transporting Containers" and assigned to Accurate Industries, Inc.; and U.S. Pat. No. 4,645,405 patented Feb. 24, 1987 to Angelo M. Cambiano on a "Roll-Off Container Handling Mechanism"; and U.S. Pat. No. 4,704,063 patented Nov. 3, 1987 to Elbert B. Updike, Jr. et al on a "Container Loading And Unloading Apparatus"; and U.S. Pat. No. 4,755,097 patented Jul. 5, 1988 to Antoine Corompt on a "Device For The Handling And Transfer Of A Load On A Vehicle Such As A Container Or A Tray" and assigned to Bennes Marrel; and U.S. Pat. No. 4,762,370 patented Aug. 9, 1988 o Antoine Corompt et al on a "Tipping Device To Control The Tipping Of A Body Mounted On A Vehicle" and assigned to Bennes Marrel; and U.S. Pat. No. 4,802,811 patented Feb. 7, 1989 to Derk Nijenhuis on an "Apparatus For Loading And Unloading An Interchangeable Container Onto And From A Vehicle" and assigned to N.C.H. Hydraulische Systemen BV; and U.S. Pat. No. 4,836,735 patented Jun. 6, 1989 to Michael J. Dennehy, Jr. et al on a "Load Positioning Container Chassis" and assigned to XTRA Corporation; and U.S. Pat. No. 4,840,532 patented Jun. 20, 1989 to Donald E. Galbreath on a "Roll-Off Hoist For Variable Positioning Of Containers" and assigned to Galbreath Incorporated; and U.S. Pat. No. 4,848,619 patented Jul. 18, 1989 to Antoine Corompt on a "Device For The Handling Of A Container" and assigned to Bennes Marrel; and U.S. Pat. No. 4,889,464 patented Dec. 26, 1989 to F. Wayne Self on a "Movable Tipping Frame For Hoist Trucks" and assigned to Translift Systems, Inc.; and U.S. Pat. No. 4,934,898 patented Jun. 19, 1990 to Donald E. Galbreath on a "Roll-Off Hoist For Variable Positioning Of Containers And Method For Use Thereof" and assigned to Galbreath Incorporated; and U.S. Pat. No. 4,943,203 patented Jul. 24, 1990 to John Bohata on a "Retriever Truck; and U.S. Pat. No. 4,954,039 patented Sep. 4, 1990 to William T. Johnston et al on a "Uniframe Rolloff Dumpster" and assigned to Trailstar Mfg. Corp.; and U.S. Pat. No. 4,986,719 patented Jan. 22, 1991 to Donald E. Galbreath on a "Roll-Off Hoist For Variable Positioning Of Containers" and assigned to Galbreath Incorporated; and U.S. Pat. No. 5,007,791 patented Apr. 16, 1991 to T. Trafford Boughton on an "ISO Container Handling System" and assigned to T.T. Broughton & Sons Ltd.; and U.S. Pat. No. 5,026,228 patented Jun. 25, 1991 to P. Michael Mansfield on a "Truck Trailer With Hydraulic Cargo Container Positioning Mechanism"; and U.S. Pat. No. 5,082,416 patented Jan. 21, 1992 to Normann Bock on a "Method Of Picking Up And Depositing A Hollow Receptacle Such As A Bin, Container Or The Like By And On, Respectively, A Vehicle With Change Gear Mechanism; Change Gear Mechanism For Carrying Out The Method; And Receptacle Designed For Use In Such Method" and assigned to Edelhoff M.S.T.S. GmbH; and U.S. Pat. No. 5,088,875 patented Feb. 18, 1992 to Donald E. Galbreath et al on a "Roll-Off Hoist For Variable Positioning Of Containers" and assigned to Galbreath Incorporated; and U.S. Pat. No. 5,163,800 patented Nov. 17, 1992 to Reijo Raisio on a "Transportable Frame And Equipment Frame For Use With Load Handling System" and assigned to Multilift Oy; and U.S. Pat. No. 5,183,371 patented Feb. 2, 1993 to Harold W. O'Daniel on an "Extendable Rolloff Trailer"; and U.S. Pat. No. 5,203,668 patented Apr. 20, 1993 to Lazar Marmur on an "Apparatus For Loading And Unloading Of A Container Structure Or Other Loads With Respect To A Truck Body Or Trailer" and assigned to E. Fisher, L. Marmur, F. Fisher and W. Kimble; and U.S. Pat. No. 5,213,466 patented May 25, 1993 to Leslie Bubik on a "Multifunction Loading And Recovery Apparatus" and assigned to Vulcan International, Inc.; and U.S. Pat. No. 5,246,329 patented Sep. 21, 1993 to Richard J. Farrell on a "Multi-Position Flat Bed Truck"; and U.S. Pat. No. 5,246,330 patented Sep. 21, 1993 to Lazar Marmur et al on an "Apparatus For Loading And Unloading Of Two Separate Containers Upon A Vehicular Body" and assigned to Automated Waste Equipment Co.; and U.S. Pat. No. 5,324,160 patented Jun. 28, 1994 to Bud Smith on a "Tiltable Trailer For Loading, Unloading And Transporting Containers"; and U.S. Pat. No. 5,460,473 patented Oct. 24, 1995 to Robert LaMora et al on a "Double Container Trailer" and assigned to Accurate Industries, Inc.; and U.S. Pat. No. 5,509,775 patented Apr. 23, 1996 to Donald H. Kendall on a "Self Loading Cargo Vehicle" and assigned to The United States of America as represented by the Secretary of the Army; and U.S. Pat. No. 5,529,454 patented Jun. 25, 1996 to Stephen D. Alm et al on a "Transporting Apparatus and Method"; and U.S. Pat. No. 5,542,807 patented Aug. 6, 1966 to Kent Kruzick on a "Vehicle Mounted, Variable Length Hook Hoist"and assigned to Galbreath Incorporated; and U.S. Pat. No. 5,562,391 patented Oct. 8, 1996 to Richard Green on a "Modular Unit Loading And Unloading Apparatus"; and U.S. Pat. No. 5,580,211 patented Dec. 3, 1996 to William F. Mengel on a "Container Transportation System"; and U.S. Pat. No. 5,601,393 patented Feb. 11, 1997 to Thomas J. Waldschmitt on a "Dual Capacity Hook-Lift Hoist" and assigned to Swaokiader U.S.A., Ltd.; and U.S. Pat. No. 5,660,446 patented Aug. 26, 1997 to Edison Pernell Weatherly on a "Dump Trailer With Multi-Stage Hopper; and U.S. Pat. No. 5,662,453 patented Sep. 2, 1997 to Steven R. Gerstner et al on a "Truck Bed Lift System And Method"; and U.S. Pat. No. 5,678,978 patented Oct. 21, 1997 to Gary R. Markham on an "Apparatus For A Tiltable Rolloff Trailer Having A Displacable Frame" and assigned to Modern, Inc.; and U.S. Pat. No. 5,718,554 patented Feb. 17, 1998 to Johnny R. McElroy on a "Truck Trailer With Removable Racks" and assigned to The McElroy Company, Inc.; and U.S. Pat. No. 5,725,350 patented Mar. 10, 1998 to Ronald E. Christenson on a "Detachable Truck Body And Handling Mechanism" and assigned to McNeilus Truck And Manufacturing Inc.; and U.S. Pat. No. 5,795,124 patented Aug. 18, 1998 to Jerry J. Kitten et al on a "Self-Loading Material Hauler And Distributor" and assigned to Jerry J. Kitten; and U.S. Pat. No. 5,779,431 patented Jul. 14, 1998 to Stephen D. Alm et al on a "Transporting Apparatus And Method" and assigned to Vulcan International, Inc.; and U.S. Pat. No. 5,807,057 patented Sep. 15, 1998 to Derk Nijenhuis on a "Transport Vehicle For Taking Up and Taking Down Containers and the Like Onto Or From A Loading Platform Thereof" and assigned to N.C.H. Hydraulische Systemen B.V.; and U.S. Pat. No. 5,813,824 patented Sep. 29, 1998 to Jerald G. Zanzig et al on a "Method Of Collecting Refuse" and assigned to The Heil Company; and U.S. Pat. No. 5,823,733 patented Oct. 20, 1998 to Kent Kruzick on a "Vehicle Mounted Hoist With Adjustable Container Supporting Roller Assemblies"; and U.S. Pat. No. 5,839,864 patented Nov. 24, 1998 to Stephen Kenneth Reynard on a "Locking System For Container-Carrying Trailer; and U.S. Pat. No. 5,848,869 patented Dec. 15, 1998 to Alexander H. Slocum et al on a "Container Restraining Mechanism and Method" and assigned to AESOP, Inc.; and U.S. Pat. No. 5,871,328 patented Feb. 16, 1999 to Donald L. Pinkston on a "Wrecker Truck With Sliding Deck"; and U.S. Pat. No. 5,913,561 patented Jun. 22, 1999 to John William Alcorn on a "Top Cover "Trapping" System For Roll-Off Container Trucks"; and U.S. Pat. No. 5,921,742 patented Jul. 13, 1999 to Brian O. Gearhart on an "Articulating Roll-Off Trailer" and assigned to Benlee, Inc.; and U.S. Pat. No. 5,951,235 patented Sep. 14, 1999 to Charles E. Young et al on an "Advanced Rollback Wheel-Lift" and assigned to Jerr-Dan Corporation; and U.S. Pat. No. 5,967,733 patented Oct. 19, 1999 to Russell Cash on a "Hydraulic Tilt Trailer" and assigned to Cash Brothers Leasing, Inc.; and U.S. Pat. No. 5,996,171 patented Dec. 7, 1999 to Randy Bowers on a "Vacuum Truck System"; and U.S. Pat. No. 6,053,692 patented Apr. 25, 2000 to Thomas M. Mason et al on a "Device For Securing A Removable Container To A Hauling Vehicle"; and U.S. Pat. No. 6,068,440 patented May 30, 2000 to Allen M. Lang et al on a "Locking Mechanism For Roll-Off Hoist" and assigned to Marathon Equipment Company; and U.S. Pat. No. 6,168,371 patented Jan. 2, 2001 to Jerome R. Lesmeister et al on a "Method Of Loading A Container" and assigned to Raymond Keith Foster; and U.S. Pat. No. 6,276,890 patented Aug. 21, 2001 to Thomas A. Pratt on a "Carrier With Articulable Bed" and assigned to Miller Industries Towing Equipment, Inc.; and U.S. Pat. No. 6,332,746 patented Dec. 25, 2001 to Allen M. Lang et al on a "Locking Mechanism For Roll-Off Hoist" and assigned to Delaware Capital Formation, Inc.; and U.S. Pat. No. 6,336,783 patented Jan. 8, 2002 to Charles E. Young et al on an "Advanced Rollback Wheel-Lift" and assigned to Jerr-Dan Corporation; and U.S. Pat. No. 6,354,787 patented Mar. 12, 2002 to Harold W. O'Daniel on a "Double Container Trailer Apparatus And Method Of Use" and assigned to G & H Manufacturing Ltd.; and U.S. Pat. No. 6,394,734 patented May 28, 2002 to Donald R. Landoll et al on a "Trailer Having Actuatable Tail Ramp"and U.S. Pat. No. 6,406,231 patented Jun. 18, 2002 to Donald R. Landoll et al on a "Container Lockdown Device" and assigned to Landoll Corporation; and U.S. Pat. No. 6,406,247 patented Jun. 18, 2002 to Andre Ghiretti et al on an "Apparatus For Loading And Unloading A Container On To And Off A Vehicle" and assigned to Palfinger AG; and U.S. Pat. No. 6,419,292 patented Jul. 16, 2002 to Bill G. Calcote et al on a "Truck Bed Conversion"; and U.S. Pat. No. 6,431,577 patented Aug. 13, 2002 to Jeffrey L. Chapman on a "Trailer Hitch Support Body; and U.S. Pat. No. 6,461,096 patented Oct. 8, 2002 to Carl R. Mentele et al on a "Tilt Bed For Loading And Transporting A Load" and assigned to Trail King Industries, Inc.; and U.S. Pat. No. 6,511,278 patented Jan. 28, 2003 to Melanie W. Harkcom et al on an "Apparatus For Securing An Implement To A Transporter" and assigned to New Holland North America, Inc.; and U.S. Pat. No. 6,537,015 patented Mar. 25, 2003 to Dae-Woo Lim et al on a "Container Loading And Unloading Apparatus" and assigned to Kosman Co., Ltd.; and U.S. Pat. No. 6,547,506 patented Apr. 15, 2003 to Albert Kirk Jacob on a "Multi-Task Truck"; and U.S. Pat. No. 6,558,104 patented May 6, 2003 to James A. Vlaanderen et al on a "Container Handling System For A Vehicle" and assigned to Stellar Industries, Inc.; and U.S. Pat. No. 6,568,892 patented May 27, 2003 to Donald R. Landoll et al on a "Container Lockdown Device" and assigned to Landoll Corporation; and U.S. Pat. No. 6,589,005 patented Jul. 8, 2003 to Curtis Hull on a "Tilt Bed Trailer" and assigned to H & H Trailer Company, Inc.

SUMMARY OF THE INVENTION

The present invention provides a uniquely improved apparatus for dual stage loading and unloading of a container on a roll-off truck or trailer body which includes a main frame which extends generally longitudinally along the vehicle and defines an upper support surface facing upwardly for the purpose of selectively receiving and retaining of a container therein during transport.

The main frame preferably includes a primary shoe member and a secondary shoe member with both being longitudinally movable with respect to the frame. Movement of the primary shoe member powers the initial loading process while simultaneous movement of the primary and second shoe member power the latter stages of loading movement.

The primary shoe is movable from the primary shoe starting position to the primary shoe final position along the frame which is defined as the primary shoe movement path. Similarly the secondary shoe member is movable along a secondary shoe movement path which extends between the defined secondary shoe starting position and the defined secondary shoe final position.

In the preferred configuration the main frame includes a first frame rail extending longitudinally along the frame and a second frame rail also extending longitudinally along the frame at a position laterally displaced from the first frame rail means to define a shoe containment zone therebetween for movably retaining of the primary shoe member and the secondary shoe member therebetween.

A base crossmember is included extending laterally across the main frame means between the first frame rail and the second frame rail and is fixedly secured with respect thereto. Also a frontal crossmember is included extending laterally across the main frame between the first frame rail and the second frame rail at a position spatially disposed from the base crossmember and fixedly secured with respect to the main frame means. The shoe containment zone is defined between the base crossmember and the frontal crossmember. Also the primary shoe movement path and the secondary shoe movement path are also defined longitudinally between the base crossmember and the frontal crossmember.

Preferably the primary shoe member is movably secured with respect to the main frame such as to be longitudinally movable therealong back and forth along the primary shoe movement path. The secondary shoe member will be movably secured with respect to the main frame such as to be movable therealong longitudinally along the second shoe movement path. Each of these movement paths are contained entirely within the shoe containment zone defined laterally between the first and second frame rails and longitudinally between the base crossmember and the frontal crossmember.

It is important that the secondary shoe movement path overlap at least a portion of the primary shoe movement path in order to facilitate abutting engagement of the primary shoe member with respect to the secondary shoe member at an intermediate position defined between the primary shoe starting position and the primary shoe final position to facilitate urging of movement of the secondary shoe member along with the primary shoe member in abutting engagement therewith along the secondary shoe movement path from the secondary shoe starting position to the secondary shoe final position. With this construction the secondary shoe final position will be located preferably longitudinally immediately adjacent the frontal crossmember. The primary shoe final position will be located longitudinally immediately adjacent the second shoe final position also. The second shoe final position will preferably particularly be located between the frontal crossmember and the primary shoe final position. The primary shoe movement path and the secondary shoe movement path will be defined within the shoe containment zone and the primary shoe member and the secondary shoe member will be movably retained within this shoe containment zone and will be free to move longitudinally along the primary shoe movement path and the secondary shoe movement path therewithin. A locking means is preferably included to maintain abutting engagement between the primary shoe member and the secondary shoe member during the latter stages of loading and during the initial stages of unloading.

A longitudinally extensible member preferably comprising a hydraulic cylinder will be attached to the base crossmember and extensible outwardly therefrom longitudinally along the main frame. This hydraulic cylinder will preferably be secured to the base cross member through a pivotally movable connection to facilitate control of movement of the primary base shoe member longitudinally away from the base cross member. This hydraulic cylinder will also be attached with respect to the primary shoe member to achieve this movement. It will be operative to preferably urge movement thereof longitudinally with respect to the main frame along the primary shoe movement path responsive to longitudinal extending of the cylinder. The longitudinally extensible member will be adapted to initiate movement of a container toward the upper support surface with enhanced power and less speed during the initial stages of movement of the primary shoe member toward the secondary shoe member. The cylinder is adapted to continue movement of the container toward the upper support surface with enhanced speed and less power after bringing the primary shoe member into abutting engagement with respect to the secondary shoe member and during subsequent simultaneous movement of the primary shoe member together with the secondary shoe member toward the frontal crossmember. This cylinder is preferably operative to move the primary shoe member along the primary shoe movement path from the primary shoe starting position toward the primary shoe final position in order to be brought into abutment with respect to the secondary shoe member positioned at the secondary shoe starting position for initiating movement thereof toward the secondary shoe final position to facilitate more rapid movement of a container onto the upper support surface of the roll-off vehicle. This cylinder is operative responsive to longitudinal extension thereof to urge this primary shoe member and secondary shoe member longitudinally along the frame away from the base crossmember and toward the frontal crossmember.

Control of movement of the two shoes is achieved by the inclusion of a flexible line means preferably comprising a metallic cable extending around a configuration of a plurality of sheaves. The plurality of sheaves preferably include a first base sheave rotatably mounted with respect to the base crossmember as well as a second base sheave also being rotatably mounted with respect to the base member. Also preferably included is a primary shoe sheave rotatably mounted with respect to the primary shoe member and movable therewith along the primary shoe movement path between the primary shoe starting position and the primary shoe final position. A secondary shoe sheave is rotatably mounted preferably with respect to the secondary shoe member and is movable therewith along the secondary shoe movement path between the secondary shoe starting position and the secondary shoe final position. Also a frontal sheave is preferably included rotatably mounted with respect to the frontal crossmember.

The flexible line or flexible metallic cable of the present invention is secured to the stationary frame, preferably by being secured directly to the base crossmember of the stationary frame, and extends outwardly therefrom around the primary shoe sheave means and extends therefrom around the first base sheave. Thereafter it extends around the secondary shoe sheave and around the second base sheave and then around the frontal sheave. Thereafter it is finally attached to the container to facilitate loading and unloading thereof with respect to the upper support surface of a roll-off vehicle.

Preferably the present invention further includes a secondary shoe stop means secured to the frame which is adapted to prevent movement of the secondary shoe member longitudinally along the main frame from the secondary shoe starting position toward the base crossmember while at the same time allowing movement of the secondary shoe member toward the secondary shoe final position. It also allows movement of the primary shoe member therepast between the primary shoe starting position and the primary shoe final position. The secondary shoe stop means defines the location of the secondary shoe starting position such that it is immediately thereadjacent preferably. The secondary shoe stop means is also secured to the main frame at a position between the primary shoe starting position and the primary shoe final position as well as being adjacent to the secondary shoe starting position. The secondary shoe stop allows full freedom of movement of the primary shoe member therepast between the primary shoe starting position and the primary shoe final position. The secondary shoe stop means is secured to the first frame rail means and to the second frame rail means and extends inwardly therebetween for selective engagement with respect to the secondary shoe member. Said secondary stop means is positioned out of engagement with respect to the primary shoe member during movement thereof along the primary shoe movement path.

Finally a base axle means may be included fixedly secured to the base member and extending outwardly therefrom such as to receive the first base sheave and the second base sheave mounted thereupon with complete freedom of rotatable movement with respect to the axle and with respect to one another.

It is an object of the apparatus for dual stage loading of a container upon a roll-off vehicle of the present invention wherein maintenance down time is minimized.

It is an object of the apparatus for dual stage loading of a container upon a roll-off vehicle of the present invention wherein maintenance expenses are minimized.

It is an object of the apparatus for dual stage loading of a container upon a roll-off vehicle of the present invention wherein initial capital costs are minimized.

It is an object of the apparatus for dual stage loading of a container upon a roll-off vehicle of the present invention wherein increased power is provided during an initial loading stage for movement of a container upon a roll-off vehicle.

It is an object of the apparatus for dual stage loading of a container upon a roll-off vehicle of the present invention wherein increased speed of movement is provided to the loading movement of the container during the latter stages of movement thereof upon a roll-off vehicle.

It is an object of the apparatus for dual stage loading of a container upon a roll-off vehicle of the present invention where in two different levels of power and two different speeds of movement are provided in an initial and a latter stage of movement while utilizing a single powering longitudinally extensible member such as an hydraulic cylinder.

It is an object of the apparatus for dual stage loading of a container upon a roll-off vehicle of the present invention wherein energy consumption is minimized.

It is an object of the apparatus for dual stage loading of a container upon a roll-off vehicle of the present invention wherein utility with various different sizes and shapes of containers and various different sizes and shapes of roll-off vehicles is possible.

It is an object of the apparatus for dual stage loading of a container upon a roll-off vehicle of the present invention to provide a primary shoe member and a secondary shoe member each movable longitudinally along a frame in locked engagement with respect to one another during the latter stages of loading and during the initial stages of unloading.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3A is a top perspective illustration of an embodiment of the apparatus for dual stage loading of a container upon a roll-off vehicle located at the termination of the first stage of movement and the initiation of the second stage of movement;

FIG. 3B is a schematic diagram of an embodiment of the cable of the present invention that corresponds to the position shown in FIG. 3A;

FIG. 6A is a top plan illustration of an embodiment of the apparatus for dual stage loading of a container upon a roll-off vehicle showing the locking mechanism prior to engagement thereof;

FIG. 6B is a side plan illustration of an embodiment of the apparatus for dual stage loading of a container upon a roll-off vehicle showing the locking mechanism prior to engagement thereof;

FIG. 7A is a top plan view of an embodiment of the apparatus for dual stage loading of a container upon a roll-off vehicle in the position immediately prior to engagement thereof;

FIG. 7B is a side plan view of an embodiment of the apparatus for dual stage loading of a container upon a roll-off vehicle in the position immediately prior to engagement thereof;

FIG. 8A is a top plan view of an embodiment of the apparatus for dual stage loading of a container upon a roll-off vehicle shown in the engaged position;

FIG. 8B is a side plan view of an embodiment of the apparatus for dual stage loading of a container upon a roll-off vehicle shown in the engaged position.

DETAILED DESCRIPTION OF THE PREFERRED EMBODIMENT

Figure 1A:
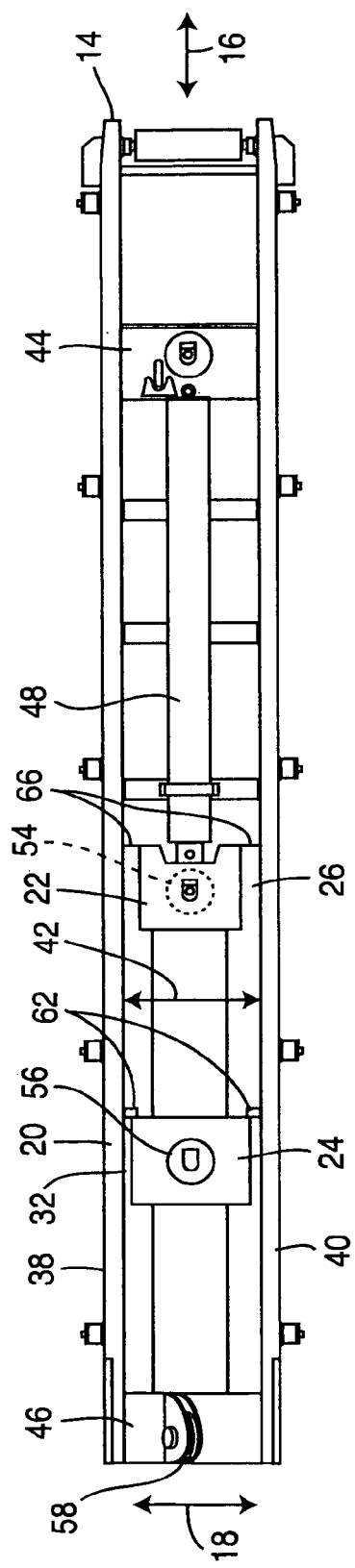
FIG. 1A is a top perspective illustration of an embodiment of the apparatus for dual stage loading of a container upon a roll-off vehicle located at the starting position.
Figure 1B:
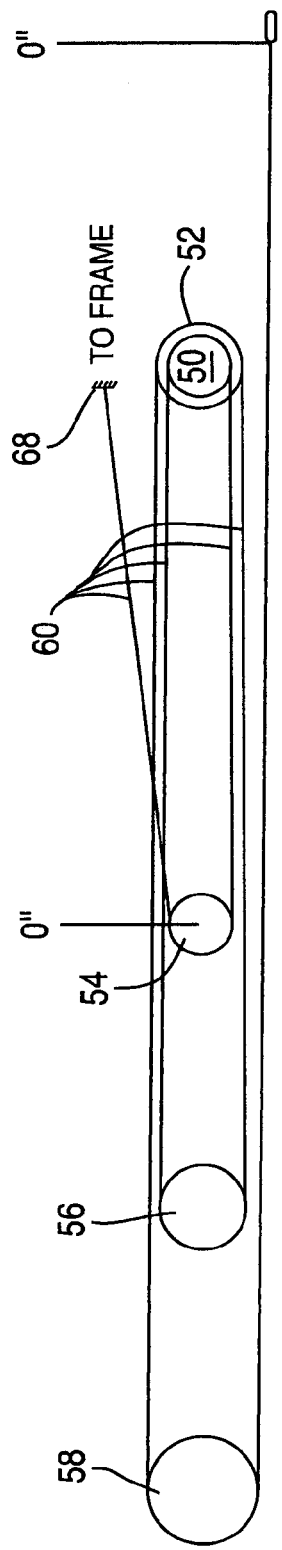
FIG. 1B is a schematic diagram of an embodiment of the cable of the present invention that corresponds to the position shown in FIG. 1A.
Figure 1C:
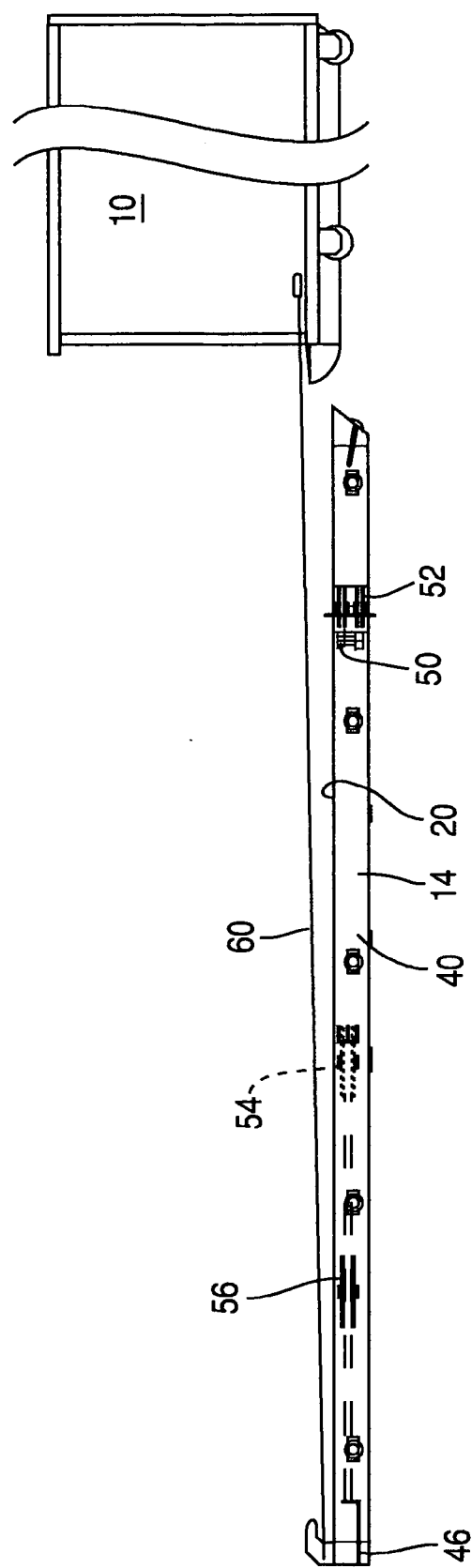
FIG. 1C is a side perspective view of the apparatus of the present invention shown attached to a container corresponding to the position shown in FIG. 1A.
Figure 2A:
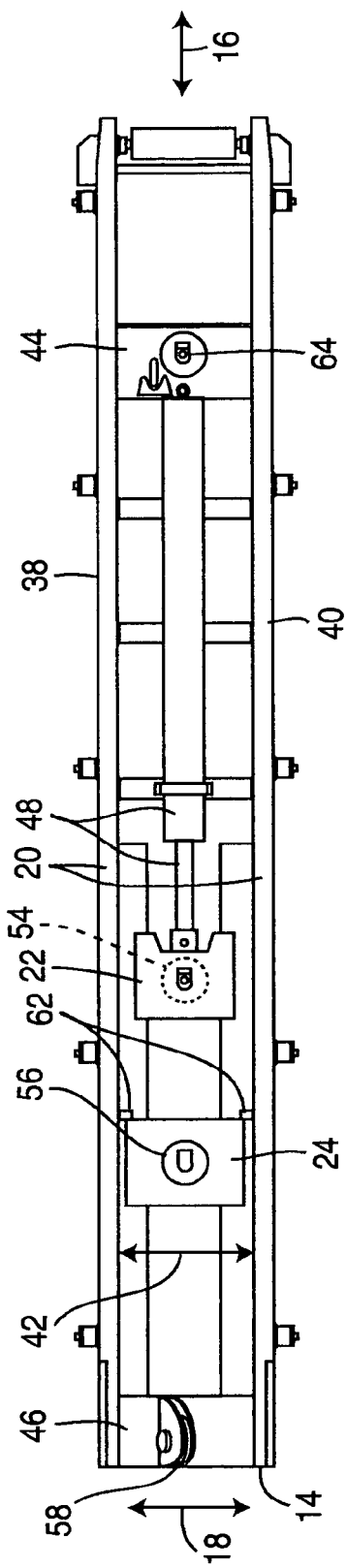
FIG. 2A is a top perspective illustration of an embodiment of the apparatus for dual stage loading of a container upon a roll-off vehicle during the initial stages of the first movement stage.
Figure 2B:
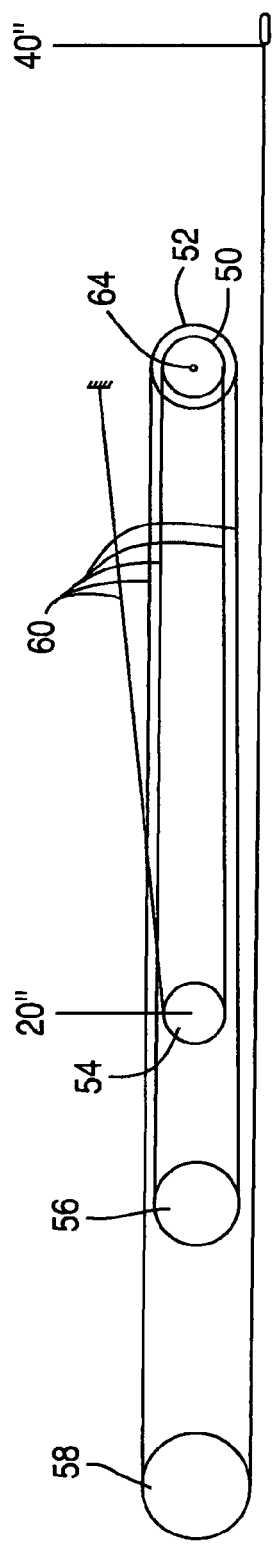
FIG. 2B is a schematic diagram of an embodiment of the cable of the present invention that corresponds to the position shown in FIG. 2A.
Figure 2C:
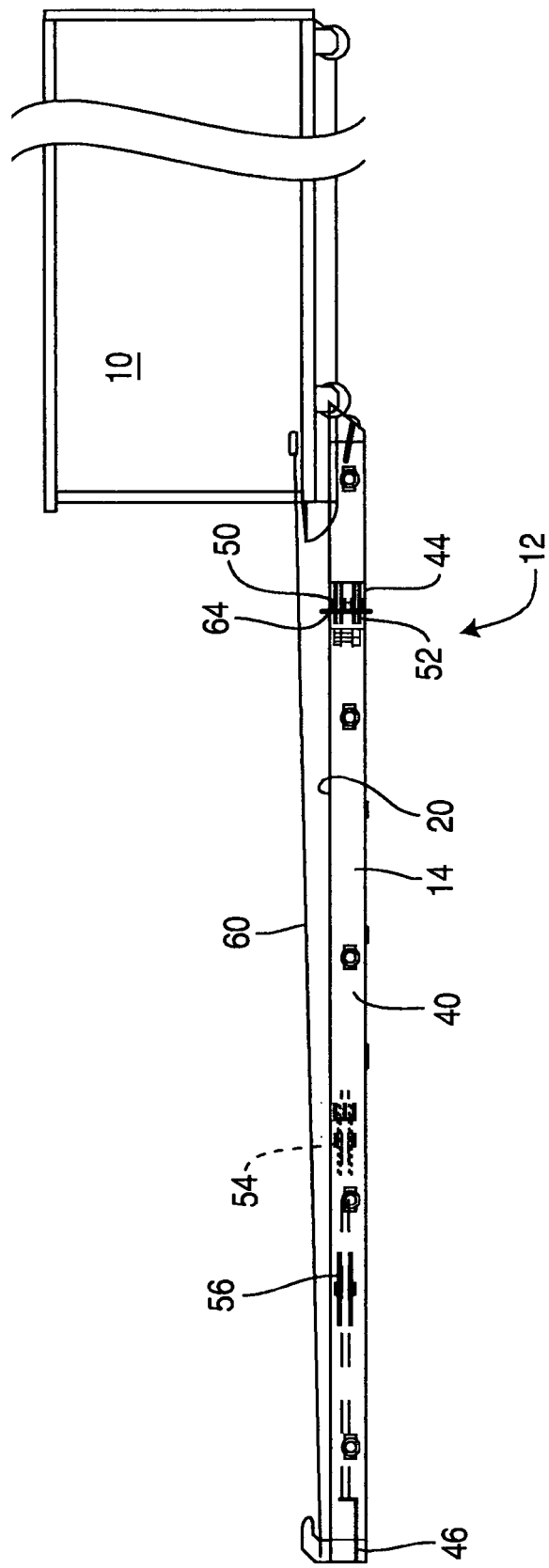
FIG. 2C is a side perspective view of the apparatus of the present invention shown attached to a container corresponding to the position shown in FIG. 2A.
Figure 3C:
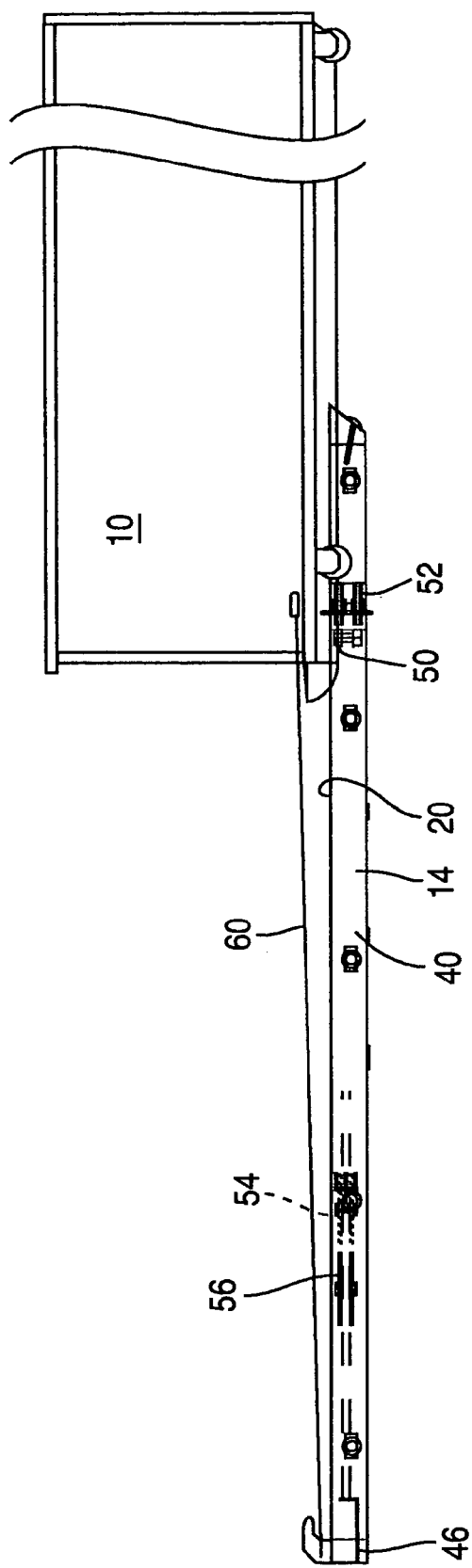
FIG. 3C is a side perspective view of the apparatus of the present invention shown attached to a container corresponding to the position shown in FIG. 3A.
Figure 4A:
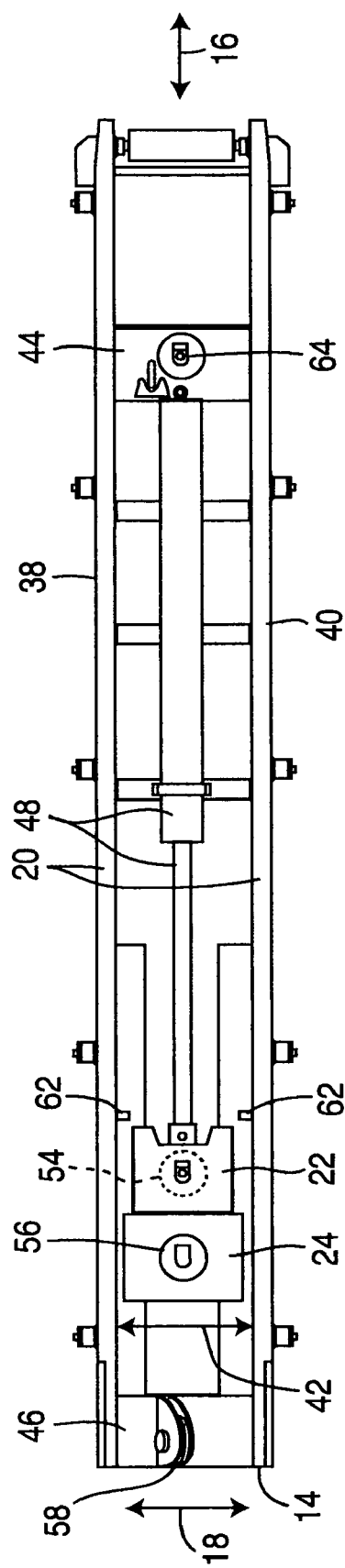
FIG. 4A is a top perspective illustration of an embodiment of the apparatus for dual stage loading of a container upon a roll-off vehicle during the second stage of movement.
Figure 4B:
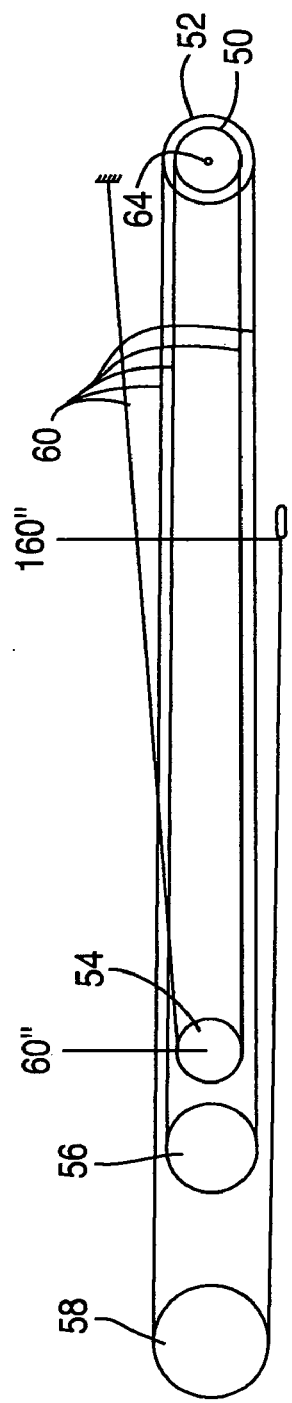
FIG. 4B is a schematic diagram of an embodiment of the cable of the present invention that corresponds to the position shown in FIG. 4A.
Figure 4C:
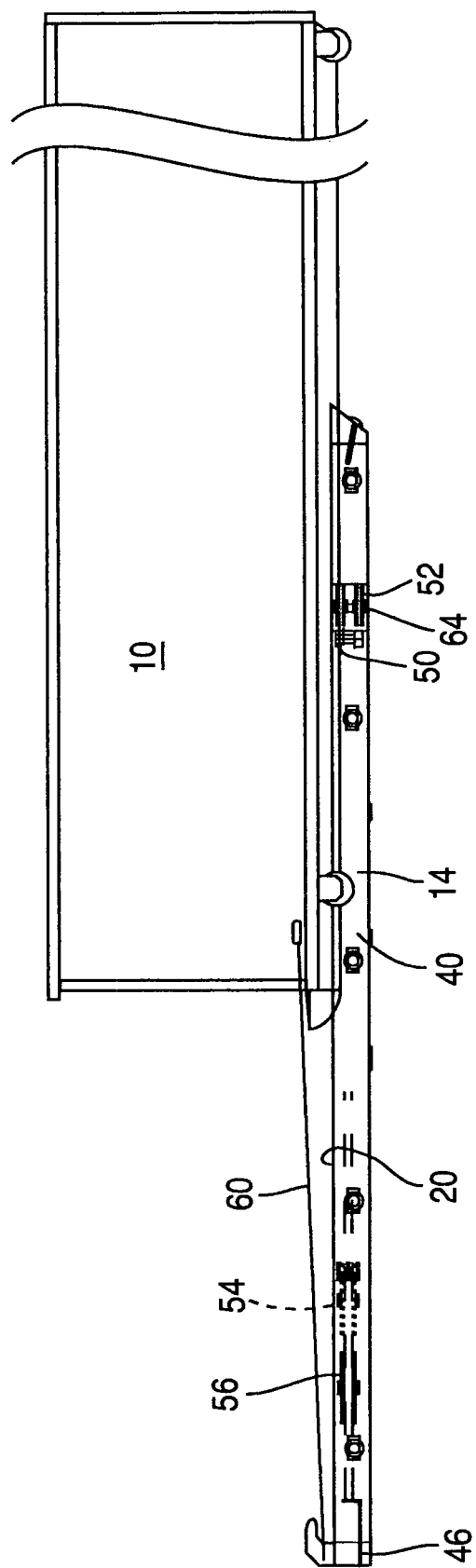
FIG. 4C is a side perspective view of the apparatus of the present invention shown attached to a container corresponding to the position shown in FIG. 4A.

The apparatus of the present invention is particularly usable for the loading and unloading of a container 10 with respect to a roll-off vehicle 12. Such roll-off vehicles are commonly truck bodies but can also comprise trailers.

The vehicle 12 will include a main frame 14 preferably including a first frame rail 38 and a second frame rail 40 which define therebetween a shoe containment zone 42. The shoe containment zone 42 is designed to receive a plurality of shoe members 22 and 24 positioned therebetween. As shown in this embodiment a primary shoe member 22 is movable in the longitudinal direction which is shown by longitudinal arrow 16 along the main frame 14 within the shoe containment zone 42. Primary shoe member 22 is movable between the primary shoe starting position 26 and the primary shoe final position 28. This path of movement is defined as the primary shoe movement path 30 which extends longitudinally with respect to the frame 14 from the primary shoe starting position 26 to the primary shoe final position 28. The secondary shoe member 24 is also movable along a secondary shoe path 36 which is defined extending from the second shoe starting position 32 to the second shoe final position 34.

Preferably the present invention includes a base crossmember 44 extending laterally across the main frame 14 and particularly between the first frame rail 38 and the second frame rail 40 at one end of the main frame 14. At the opposite end a frontal crossmember 46 is fixedly secured to the main frame 14 to extend laterally thereacross. The frontal crossmember 46 and the base crossmember 44 define the shoe containment zone 42 in the longitudinal direction 16 whereas the first and second frame rails 38 and 40 define the shoe containment zone 42 as shown by lateral direction arrow 18.

Powering of the movement of the primary shoe member 22 and the secondary shoe member 24 along the respective paths of movement is achieved by a longitudinally extensible member 48 which preferably comprises a hydraulic cylinder. This hydraulic cylinder is preferably secured at one end to the base crossmember 44 and is secured at the other end to the primary shoe member 22. Preferably the mounting connection between the hydraulic cylinder 48 and the base crossmember 44 is a pivotal connection to provide some flexibility of movement of the cylinder 48 with respect to the main frame 14 and all the members fixedly secured thereto.

With this construction longitudinal extension of the hydraulic cylinder 48 will cause longitudinal movement of the primary shoe member 22 along the primary shoe movement path 30 from the primary shoe starting position 26 t the primary shoe final position 28. Movement of the secondary shoe member 24 along the secondary shoe path 36 will be initiated during the second stage of operation of the apparatus of the present invention responsive to movement of the primary shoe member 22 into abutting engagement with the secondary shoe member 24 as will be described below.

Control of movement of the container 10 onto the upper support surface 20 defined by the main frame 14 will be achieved by the inclusion of a plurality of rotatable sheaves as well as a flexible line means 60 which will preferably take the form of a metallic or fiber cable. 29

A first base sheave 50 is pivotally secured with respect to the base crossmember 44 as well as a second base sheave 52 which is also pivotally secured with respect to the base crossmember 44. In the preferred configuration a base axle 64 will be fixedly secured to the base crossmember 44 and extend outwardly therefrom with the first base sheave means 50 and the second base sheave 52 both rotatably mounted thereon. In this preferred embodiment the first base sheave 50 and the second base sheave 52 will be separately and individually rotatable independent of one another.

A primary shoe sheave means 54 will also be included pivotally mounted with respect to the primary shoe member 22. Similarly a secondary shoe sheave means 56 will be rotatably mounted with respect to the secondary shoe member 24. Also included in the present invention preferably will be a frontal sheave means 58 pivotally mounted upon the frontal crossmember 46.

In the preferred configuration of the present invention the flexible cable or flexible line 60 will be secured fixedly with respect to the main frame 14. That cable will extend from this fixed connection to the frame 68 around the primary shoe sheave 54 and will then extend around the first base sheave means 50. The cable 60 will then extend from first base sheave 50 to the secondary shoe sheave means 56 and extend around that sheave. Thereafter the cable 60 will extend around the second base sheave means 52 and thereafter back to the position adjacent the front of the vehicle around the frontal sheave which is pivotally mounted to the frontal sheave 58 which is pivotally mounted with respect to the frontal crossmember 46. Thereafter the line will extend rearwardly from the roll-off vehicle 12 and be attached directly to the container to facilitate powering of loading thereof upon the upper support surface 20. It is important that the securement of cable 60 to the frame at frame securement point 68 be firm to maintain correct operation of the apparatus of the present invention.

Longitudinal movement of the secondary shoe member 24 is facilitated in the longitudinal direction 16 with respect to the main frame 14 between the secondary shoe starting position 32 and the secondary shoe final position 34. Movement of this secondary shoe member 24 toward the base crossmember 44 from the secondary shoe starting position 32 is prevented by stop means 62. Stop means 62 basically comprises a member which extends inwardly and prevents rearward movement therepast by the secondary shoe member 24.

However, movement of the primary shoe member 22 is required between the primary shoe starting position 26 and the primary shoe final position 28. The secondary shoe 24 will be somewhat smaller or in some way be incapable of abutting or contacting of the secondary shoe stop means 62 and, as such, movement thereby will be possible. This is important in view of the fact that the primary shoe movement path 30 extends longitudinally forwardly and rearwardly relative to the secondary shoe stop means 62. The secondary shoe stop means 62 is operable to restrict movement of the secondary shoe member 24 therepast but allow movement of the primary shoe member 22 therepast.

A primary shoe stop means 66 is also included in the present invention which defines immediately thereadjacent the primary shoe starting position 26 of the primary shoe movement path 30. Thus, primary shoe stop means 66 prevents movement of the primary shoe member 22 from the primary shoe starting position 26 rearwardly therefrom toward the base crossmember 44 and establishes a starting position for operation of the apparatus of the present invention.

Maintaining engagement between the primary shoe member 22 and the secondary shoe member 24 during portions of powering of loading and unloading in accordance with the present invention is an important consideration. As such, a locking means 90 will be secured to the secondary shoe member 24 and a lock engagement means 92 will be secured to the primary show member 22. Locking means 90 will be adapted to engage lock engagement means 92 responsive to abutting engagement between shoes 22 and 24.

Preferably, the two shoe members 22 and 24 will be interlocked during loading once the primary shoe member 22 has been moved into abutting engagement with respect to the secondary shoe member 24. Immediately thereafter the two mutually engaged shoes will move toward the respect final positions thereof, namely, primary shoe starting position 26 and secondary shoe final position 34. After these final positions are reached by the two shoes, engagement will be maintained therebetween. They will remain engaged also during the initial stages of unloading movement thereof. During unloading as the hydraulic cylinder 48 longitudinally retracts, the secondary shoe member 24 will be moving toward the secondary shoe starting position 34. A locking disengagement means 94 will be positioned on the frame adjacent to the secondary shoe starting position 32 for the purpose of causing disengagement of the locking means 90 from the lock engagement means 92 and, thus, releasing the primary shoe member 22 from the secondary shoe member 24. This will allow the secondary shoe member 24 to remain in the secondary shoe starting position 32 as the primary shoe member 22 moves toward the primary shoe starting position 26 at which point the apparatus of the present invention will have completed the unloading operation and be again ready to initiate a loading sequence.

In operation with the present invention initially the cable will be secured with respect to a container to be loaded. A path of a predetermined length is established by measuring along the path of the cable 60 as it moves from the point of attachment to the frame 68 around all of the sheaves as defined hereabove and ultimately where attached with respect to the container itself. This path will be lengthened as the apparatus of the present invention is operated and initially as the primary shoe member 22 starts movement from the primary shoe starting position 26 toward the primary shoe final position 28. As this movement occurs the length of the path of the cable will be lengthened causing the cable which is of a fixed given length to pull the container up onto the upper support surface 20 of the roll-off vehicle 12.

Operation of this apparatus is initially achieved by actuation of the longitudinally extensible member 48 which in this embodiment comprises the hydraulic cylinder. The cylinder will begin to extend to initiate movement of the primary shoe member 22 from the primary shoe starting position 26 toward the secondary shoe member 24 along the primary shoe movement path 30. Initially when the apparatus of the present invention is first started the primary shoe member 22 will be in the primary shoe starting position 26 and the secondary shoe member 24 will be in the secondary shoe starting position 32.

The initial extension of the hydraulic cylinder 48 will cause primary shoe member 22 to start to move from the initial position toward the front of the vehicle or to the left as shown in FIGS. 1A, 1B and 1C and 2A, 2B and 2C. This initial movement will provide enhanced power and a slow speed of movement for the container as it moves toward the upper support surface 20. Once the cylinder 48 is extended to such a point that it is brought into abutment with the secondary shoe member 24 which is in the secondary shoe starting position 32 the second stage of powering of the apparatus of the present invention is initiated. At this position, the locking apparatus will lock together the two shoe members 22 and 24. During this second stage the further movement of the primary shoe member 22 will cause simultaneous movement of the secondary shoe member 24 which is in abutment therewith. In this phase of the movement the hydraulic cylinder 48 will cause movement of the primary shoe member 22 and the secondary shoe member 24 toward their respective final positions 28 and 34.

Figure 5A:
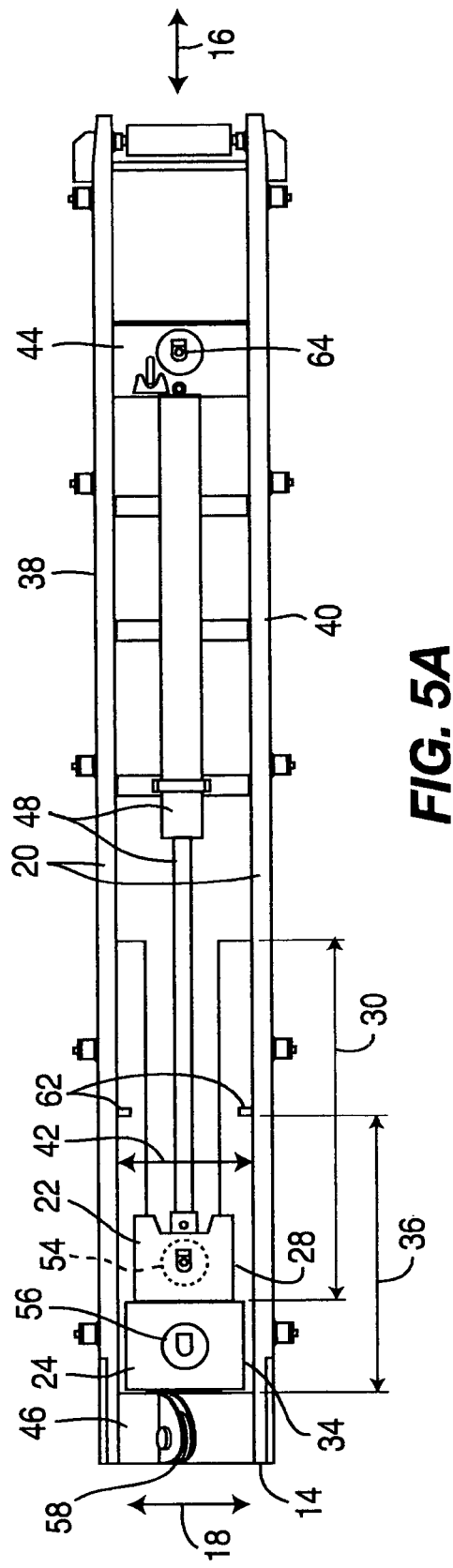
FIG. 5A is a top perspective illustration of an embodiment of the apparatus for dual stage loading of a container upon a roll-off vehicle located at the end of the second stage of movement with the container moved to the fully loaded position.
Figure 5B:
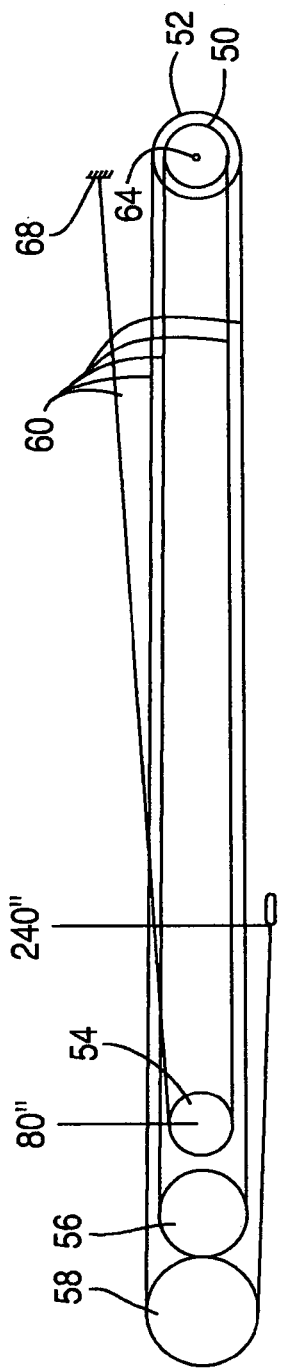
FIG. 5B is a schematic diagram of an embodiment of the cable of the present invention that corresponds to the position shown in FIG. 5A.
Figure 5C:
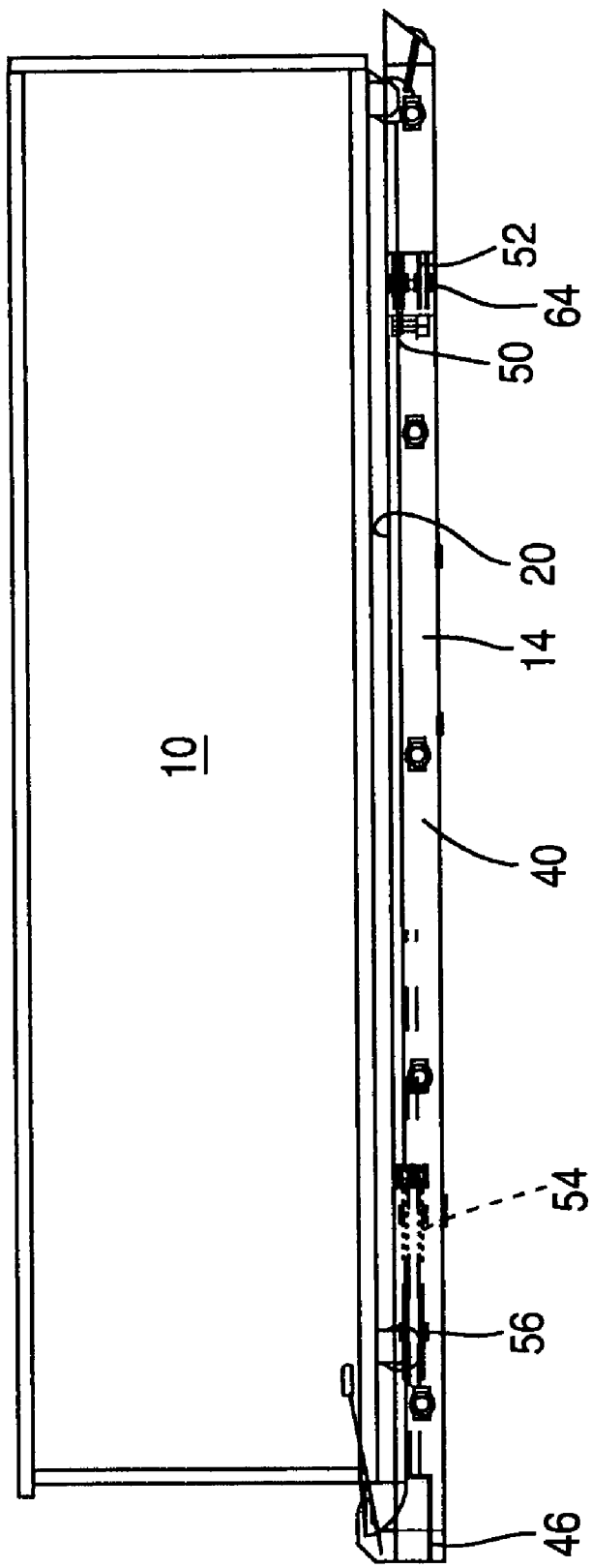
FIG. 5C is a side perspective view of the apparatus of the present invention shown attached to a container corresponding to the position shown in FIG. 5A.
Figure 9:
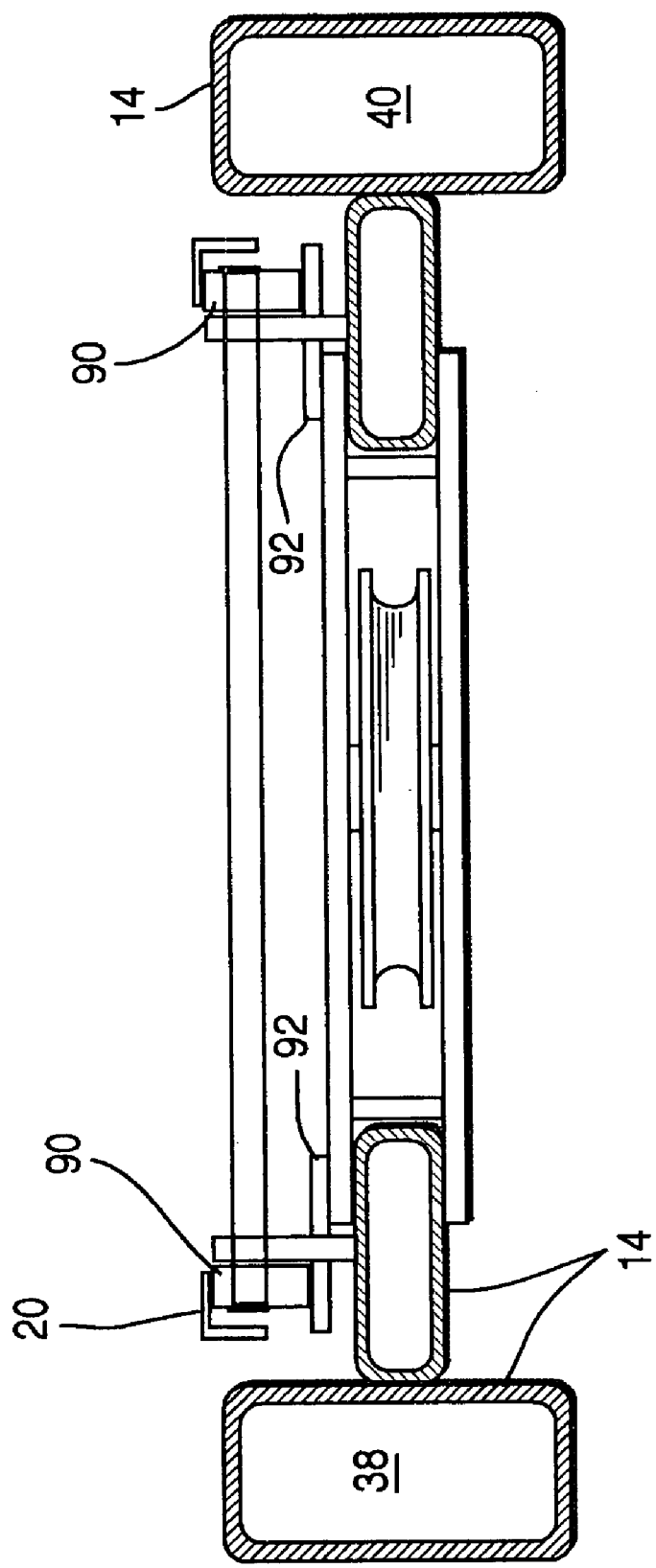
FIG. 9 is a side cross-sectional view of FIG. 8A along lines 9—9.

Once the movement of the secondary shoe member 24 is initiated, then the hydraulic cylinder 48 will be causing the secondary shoe sheave means 56 as well as the primary shoe sheave means 54 to move toward the frontal crossmember 46. This will greatly increase the speed of movement of the cable which will increase the speed of movement of the container 10 toward the upper support surface 20 however this movement will be less powerful. Finally the secondary shoe member 24 will reach the secondary shoe final position 34 and the primary shoe member 22 will reach the primary shoe final position 28. At this point the container will be moved to the completely loaded position as shown in FIGS. 5A, 5B and 5C.

It is important to appreciate that the leverage provided during the initial stage of operation prior to any movement of the secondary shoe member 24 is significantly greater than during the second stage when movement of shoe 24 occurs. This is important during the initial stage of movement since the container is often dragged along the ground or is perhaps frozen in place or embedded in the earth during these important initial stages of movement. Speed is sacrificed, however power is enhanced. Once both shoes 22 and 24 are both moving then the power will be lessened but the speed of movement will increase. This is because normally by this point the front portion of the container is already in engagement with the upper support surface 20 and less power is needed and it is a distinct advantage to increase the loading speed in order to increase the overall total loading speed of both stages. Thus the present invention through this unique construction provides the significant advantage of enhanced power during the initial stage of loading and enhanced speed during the second stage of loading.

The apparatus of the present invention is also useful for unloading a container from a roll-off vehicle. However, when unloading the force of gravitation works for the apparatus rather than against the apparatus and, as such, it is only necessary that general guidance of movement be achieved rather than full powering of movement. This is normally achieved by tilting the main bed of the roll-off vehicle 12 such that the upper support surface 20 is inclined rearwardly to facilitate unloading by making further use of gravitational forces exerted against the container 10 while being unloaded. Once the two mutually engaged shoes 22 and 24 are moved such that secondary shoe member 24 has returned to the secondary shoe starting position 32 then the lock disengagement means 66 will disengage locking means 90 from lock engagement means 92 resulting in disengagement of shoes members 22 and 24 from one another. This disengagement will allow secondary shoe member 24 to remain at the secondary shoe starting position 32 as the primary shoe member 22 is moved to the primary shoe starting position which will complete unloading movement of the apparatus and reset the apparatus to facilitate starting of the loading process again whenever needed.

This embodiment disclosed in this detailed description shows a configuration for the assembly of locking parts for use with the present invention. It should be appreciated that the locking assembly can be of a variety of different constructions and the one described herebelow is only one of many possible such designs. However, this is an embodiment for providing the various locking parts for selectively securing of the primary shoe member 20 with respect to the secondary shoe member 24 as needed in order to achieve correct operation of the apparatus of the present invention.

In this embodiment of the locking assembly a locking means 90 is included which includes at least one pivotally mounted locking member which is pivotally secured with respect to the secondary shoe member 24. It is selectively engageable with respect to a lock engagement means 92 which is preferably configured as a rectangular member fixedly secured with respect to the primary shoe member 22. The locking means 90 and the lock engagement means 92 are adapted to engage with respect to one another to firmly hold the primary shoe member 22 and the secondary shoe member 24 in abutment with respect to one another in the latter stages of the loading movement and in the initial stages of the unloading movement.

In operation, initially as shown in FIGS. 6A and 6B, the primary shoe member 22 will start to move to the left as shown in FIG. 6A toward the secondary shoe member 24.

Similarly this will cause the rectangularly shaped lock engagement device 92 to be moved toward the locking means 90. This movement is caused by longitudinal extension of the hydraulic cylinder 48 to the left as shown in FIG. 6A which results in movement of the primary shoe member 22 toward the secondary shoe member 24.

FIGS. 7A and 7B show the relative position of the primary shoe member 22 and the secondary shoe member 24 as the primary shoe member 22 is moved into abutment therewith. Abutting contact between the shoes 22 and 24 will initiate movement of the lever of locking means 90 downwardly such that it is moved toward a position of engagement with respect to the lock engagement device which in this case is a rectangular block 92. The locking means 90 and the lock engagement device 92 will engage one another as shown best in FIG. 8B and this engagement will be maintained as the primary shoe member 22 is moved further to the left as shown in FIGS. 8A and 8B which result is in movement of the secondary shoe member 24 from the secondary shoe starting position 32 to the secondary shoe final position 34. Once the secondary shoe member 24 reaches the secondary shoe final position 34 the primary shoe member 22 will also reach the primary shoe final position 28 and the container 10 will be fully loaded and positioned upon the upper support surface 20 of main frame 14. At this point in operation of the apparatus of the present invention the shoe members 22 and 24 will be locked in engagement with respect to one another by locking engagement between locking means 90 and lock engagement means 92.

During unloading the hydraulic cylinder 48 will initiate movement to the right as shown in FIG. 8A while engagement between the shoes 22 and 24 will be maintained by maintaining securement between the locking means 90 and the lock engagement means 92. This combined unit comprising both shoes 22 and 24 will move to the right or rearwardly with respect to the main frame 14 until the secondary shoe member 24 reaches the secondary shoe starting position 32. Adjacent this position a lock engagement device 94 will be included. In the present invention this lock engagement device comprises a fixed frame release section or pusher member 98 as shown best in FIG. 8B extending outwardly from the main frame 14. This fixed frame release section or pusher 98 is adapted to engage the horizontal cross bar 100 of the lock disengagement means to cause counterclockwise pivotal movement of the lever of locking means 90 in order to disengage it from the lock engagement means 92. Thus the pusher member 98 will be brought into abutment with respect to the horizontal cross bar 100 to cause the locking means 90 and lock engagement means 92 to disengage from one another thereby disengaging the primary shoe member 22 from the secondary shoe member 24. Thereafter the primary shoe member 22 will continue to move to the right until it reaches the primary shoe starting position 26 at which point operation of the hydraulic cylinder will terminate and the apparatus of the present invention will reach the completely unloaded position and will be ready again for initiating a loading movement process.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An apparatus for dual stage loading of a container upon a roll-off vehicle comprising:
   A. a main frame means extending longitudinally and defining an upper support surface thereupon for receiving of a container thereupon, said main frame means defining a primary shoe starting position and a primary shoe final position spatially disposed with respect to one another and defining a primary shoe movement path extending therebetween, said main frame means also defining a secondary shoe starting position and a secondary shoe final position spatially disposed with respect to one another and defining a secondary shoe movement path extending therebetween;
   B. a base crossmember extending laterally across said main frame means and fixedly secured with respect thereto;
   C. a frontal crossmember extending laterally across said main frame means at a position spatially disposed from said base crossmember and fixedly secured with respect to said main frame means;
   D. a primary shoe member movably secured with respect to said main frame means to be movable therealong longitudinally along said primary shoe movement path;
   E. a secondary shoe member movably secured with respect to said main frame means to be movable therealong longitudinally along said secondary shoe movement path, said secondary shoe movement path overlapping a portion of said primary shoe movement path in order to facilitate abutment of said primary shoe member with respect to said secondary shoe member at an intermediate position defined between said primary shoe starting position and said primary shoe final position to urge movement of said primary shoe member along with said secondary shoe member in abutting engagement therewith along the secondary shoe movement path from said secondary shoe starting position toward said secondary shoe final position;
   F. a longitudinally extensible member attached to said base crossmember and extensible outwardly therefrom longitudinally along said main frame means, said longitudinally extensible member also being attached with respect to said primary shoe member and operative to urge movement thereof longitudinally with respect to said main frame means along said primary shoe movement path responsive to longitudinal extending of said longitudinally extensible member;
   G. a first base sheave means rotatably mounted with respect to said base crossmember;
   H. a second base sheave means also being rotatably mounted with respect to said base crossmember;
   I. a primary shoe sheave means rotatably mounted with respect to said primary shoe member and movable therewith along said primary shoe movement path between said primary shoe starting position and said primary shoe final position;
   J. a secondary shoe sheave means rotatably mounted with respect to said secondary shoe member and movable therewith along said secondary shoe movement path between said secondary shoe starting position and said secondary shoe final position;
   K. a frontal sheave means rotatably mounted with respect to said frontal crossmember; and
   L. a flexible line means secured to said frame means and extending outwardly therefrom around said primary shoe sheave means and then around said first base sheave means and then around said secondary shoe sheave means and then around said second base sheave means and then around said frontal sheave means and then attached to a container to facilitate loading thereof upon said upper support surface of a roll-off vehicle.

2. An apparatus for dual stage loading of a container upon a roll-off vehicle as defined in claim 1 wherein said longitudinally extensible member comprises an hydraulic cylinder means.

3. An apparatus for dual stage loading of a container upon a roll-off vehicle as defined in claim 2 wherein said hydraulic cylinder means is pivotally secured to said base crossmember to facilitate control of movement of said primary base shoe member longitudinally away from said base crossmember.

4. An apparatus for dual stage loading of a container upon a roll-off vehicle as defined in claim 1 further including a base axle means fixedly secured to said base crossmember and extending outwardly therefrom to receive said first base sheave means rotatably mounted thereupon.

5. An apparatus for dual stage loading of a container upon a roll-off vehicle as defined in claim 4 wherein said second base sheave means is also rotatably mounted on said base axle means.

6. An apparatus for dual stage loading of a container upon a roll-off vehicle as defined in claim 1 further comprising a secondary shoe stop means secured to said main frame means and adapted to prevent movement of said secondary shoe member longitudinally along said main frame means from said secondary shoe starting position toward said base crossmember and to allow movement of said secondary shoe member toward said secondary shoe final position and also allowing movement of said primary shoe member therepast between said primary shoe starting position and said primary shoe final position.

7. An apparatus for dual stage loading of a container upon a roll-off vehicle as defined in claim 6 wherein said secondary shoe stop means defines the location of said secondary shoe starting position immediately thereadjacent.

8. An apparatus for dual stage loading of a container upon a roll-off vehicle as defined in claim 7 wherein said secondary shoe stop means is secured to said main frame means at a position between said primary shoe starting position and said primary shoe final position and adjacent said secondary shoe starting position.

9. An apparatus for dual stage loading of a container upon a roll-off vehicle as defined in claim 8 wherein said secondary shoe stop means allows full freedom of movement of said primary shoe member therepast between said primary shoe starting position and said primary shoe final position.

10. An apparatus for dual stage loading of a container upon a roll-off vehicle as defined in claim 9 wherein said primary shoe member as being moved along said primary shoe movement path from said primary shoe starting position toward said primary shoe final position is adapted to be brought into abutment with respect to said secondary shoe member positioned at said secondary shoe starting position for initiating movement thereof toward said secondary shoe final position to facilitate more rapid movement of a container onto said upper support surface on a roll-off vehicle.

11. An apparatus for dual stage loading of a container upon a roll-off vehicle as defined in claim 1 wherein said secondary shoe final position is located longitudinally immediately adjacent said frontal crossmember.

12. An apparatus for dual stage loading of a container upon a roll-off vehicle as defined in claim 11 wherein said primary shoe final position is located longitudinally immediately adjacent said secondary shoe final position.

13. An apparatus for dual stage loading of a container upon a roll-off vehicle as defined in claim 12 wherein said secondary shoe final position is located between said frontal crossmember and said primary shoe final position.

14. An apparatus for dual stage loading of a container upon a roll-off vehicle as defined in claim 1 wherein said longitudinally extensible member is adapted to initiate movement of a container toward said upper support surface with enhanced power and less speed during initial movement of said primary shoe member toward said secondary shoe member and wherein said longitudinally extensible member is adapted to continue movement of a container toward said upper support surface with enhanced speed and less power after bringing said primary shoe member into abutting engagement with respect to said secondary shoe member and during subsequent simultaneous movement of said primary shoe member together with said secondary shoe member toward said frontal crossmember.

15. An apparatus for dual stage loading of a container upon a roll-off vehicle as defined in claim 1 wherein said main frame means includes:
  A. a first frame rail means extending longitudinally at least from said base crossmember to said frontal crossmember; and
  B. a second frame rail means also extending longitudinally at least from said base crossmember to said frontal crossmember and being spatially disposed laterally from said first frame rail means to define a shoe containment zone therebetween.

16. An apparatus for dual stage loading of a container upon a roll-off vehicle as defined in claim 15 wherein said primary shoe movement path and said secondary shoe movement path are defined within said shoe containment zone and wherein said primary shoe member and said secondary shoe member are movably retained within said shoe containment zone and are free to move longitudinally along said primary shoe movement path and said secondary shoe movement path, respectively.

17. An apparatus for dual stage loading of a container upon a roll-off vehicle as defined in claim 1 wherein said secondary shoe stop means is secured to said first frame rail means and to said second frame rail means extending inwardly therefrom for selective engagement with respect to said secondary shoe member and is positioned out of engagement with respect to said primary shoe member during movement thereof along said primary shoe movement path.

18. An apparatus for dual stage loading of a container upon a roll-off vehicle as defined in claim 1 wherein said longitudinally extensive member is operative responsive to longitudinal extension thereof to urge movement of said primary shoe member and said secondary shoe member longitudinally along said frame means away from said base crossmember and toward said frontal crossmember.

19. An apparatus for dual stage loading of a container upon a roll-off vehicle as defined in claim 1 further comprising a locking means mounted on said primary shoe member and said secondary shoe member for selectively maintaining engagement therebetween.

20. An apparatus for dual stage loading of a container upon a roll-off vehicle as defined in claim 19 wherein said locking means maintains said primary shoe member in engagement with respect to said secondary shoe member whenever said secondary shoe member is moving along said secondary shoe movement path between said secondary shoe starting position and said secondary shoe final position and while said secondary shoe member is located in said secondary shoe final position.

21. An apparatus for dual stage loading of a container upon a roll-off vehicle comprising:
- A. a main frame means extending longitudinally and defining an upper support surface thereupon for receiving of a container thereupon, said main frame means defining a primary shoe starting position and a primary shoe final position spatially disposed with respect to one another and defining a primary shoe movement path extending therebetween, said main frame means also defining a secondary shoe starting position and a secondary shoe final position spatially disposed with respect to one another and defining a secondary shoe movement path extending therebetween;
- B. a base crossmember extending laterally across said main frame means and fixedly secured with respect thereto;
- C. a frontal crossmember extending laterally across said main frame means at a position spatially disposed from said base crossmember and fixedly secured with respect to said main frame means;
- D. a primary shoe member movably secured with respect to said main frame means to be movable therealong longitudinally along said primary shoe movement path;
- E. a secondary shoe member movably secured with respect to said main frame means to be movable therealong longitudinally along said secondary shoe movement path, said secondary shoe movement path overlapping a portion of said primary shoe movement path in order to facilitate abutment of said primary shoe member with respect to said secondary shoe member at an intermediate position defined between said primary shoe starting position and said primary shoe final position to urge movement of said secondary shoe member along with said primary shoe member in abutting engagement therewith along the secondary shoe movement path from said secondary shoe starting position toward said secondary shoe final position;
- F. a longitudinally extensible member comprising an hydraulic cylinder means attached to said base crossmember and extensible outwardly therefrom longitudinally along said main frame means, said longitudinally extensible member also being attached with respect to said primary shoe member and operative to urge movement thereof longitudinally with respect to said main frame means along said primary shoe movement path responsive to longitudinal extending of said longitudinally extensible member, said longitudinally extensible member being adapted to initiate movement of a container toward said upper support surface with enhanced power and less speed during initial movement of said primary shoe member toward said secondary shoe member and wherein said longitudinally extensible member is adapted to continue movement of a container toward said upper support surface with enhanced speed and less power after bringing said primary shoe member into abutting engagement with respect to said secondary shoe member and during subsequent simultaneous movement of said primary shoe member together with said secondary shoe member toward said frontal crossmember;
- G. a first base sheave means rotatably mounted with respect to said base crossmember;
- H. a second base sheave means also being rotatably mounted with respect to said base crossmember;
- I. a primary shoe sheave means rotatably mounted with respect to said primary shoe member and movable therewith along said primary shoe movement path between said primary shoe starting position and said primary shoe final position;
- J. a secondary shoe sheave means rotatably mounted with respect to said secondary shoe member and movable therewith along said secondary shoe movement path between said secondary shoe starting position and said secondary shoe final position;
- K. a frontal sheave means rotatably mounted with respect to said frontal crossmember;
- L. a flexible line means secured to said frame means and extending outwardly therefrom around said primary shoe sheave means and then around said first base sheave means and then around said secondary shoe sheave means and then around said second base sheave means and then around said frontal sheave means and then attached to a container to facilitate loading thereof upon said upper support surface of a roll-off vehicle; and
- M. a secondary shoe stop means secured to said main frame means and adapted to prevent movement of said secondary shoe member longitudinally along said main frame means from said secondary shoe starting position toward said base crossmember and to allow movement of said secondary shoe member toward said secondary shoe final position and also allowing movement of said primary shoe member therepast between said primary shoe starting position and said primary shoe final position, said secondary shoe stop means defining the location of said secondary shoe starting position immediately thereadjacent, said secondary shoe stop means being secured to said main frame means at a position between said primary shoe starting position and said primary shoe final position and adjacent said secondary shoe starting position.

22. An apparatus for dual stage loading of a container upon a roll-off vehicle comprising:
- A. a main frame means extending longitudinally and defining an upper support surface thereupon for receiving of a container thereupon, said main frame means defining a primary shoe starting position and a primary shoe final position spatially disposed with respect to one another and defining a primary shoe movement path extending therebetween, said main frame means also defining a secondary shoe starting position and a secondary shoe final position spatially disposed with respect to one another and defining a secondary shoe movement path extending therebetween, said main frame means including:
  - (1) a first frame rail means extending longitudinally; at least from said base crossmember to said frontal crossmember;
  - (2) a second frame rail means also extending longitudinally at a position spatially disposed laterally from said first frame rail means to define a shoe containment zone therebetween;
- B. a base crossmember extending laterally across said main frame means between said first frame rail means and said second frame rail means and being fixedly secured with respect thereto;
- C. a frontal crossmember extending laterally across said main frame means between said first frame rail means and said second frame rail means at a position spatially disposed from said base crossmember and fixedly secured with respect to said main frame means;

D. a primary shoe member movably secured with respect to said main frame means to be movable therealong longitudinally along said primary shoe movement path;

E. a secondary shoe member movably secured with respect to said main frame means to be movable therealong longitudinally along said secondary shoe movement path, said secondary shoe movement path overlapping a portion of said primary shoe movement path in order to facilitate abutment of said primary shoe member with respect to said secondary shoe member at an intermediate position defined between said primary shoe starting position and said primary shoe final position to urge movement of said secondary shoe member along with said primary shoe member in abutting engagement therewith along the secondary shoe movement path from said secondary shoe starting position toward said secondary shoe final position, said secondary shoe final position being located longitudinally immediately adjacent said frontal crossmember, said primary shoe final position being located longitudinally immediately adjacent said secondary shoe final position, said secondary shoe final position being located between said frontal crossmember and said primary shoe final position, said primary shoe movement path and said secondary shoe movement path being defined within said shoe containment zone and said primary shoe member and said secondary shoe member being movably retained within said shoe containment zone and being free to move longitudinally along said primary shoe movement path and said secondary shoe movement path, respectively;

F. a longitudinally extensible member comprising an hydraulic cylinder means attached to said base crossmember and extensible outwardly therefrom longitudinally along said main frame means, said hydraulic cylinder means being pivotally secured to said base crossmember to facilitate control of movement of said primary base shoe member longitudinally away from said base crossmember, said longitudinally extensible member also being attached with respect to said primary shoe member and operative to urge movement thereof longitudinally with respect to said main frame means along said primary shoe movement path responsive to longitudinal extending of said longitudinally extensible member, said longitudinally extensible member being adapted to initiate movement of a container toward said upper support surface with enhanced power and less speed during initial movement of said primary shoe member toward said secondary shoe member and wherein said longitudinally extensible member is adapted to continue movement of a container toward said upper support surface with enhanced speed and less power after bringing said primary shoe member into abutting engagement with respect to said secondary shoe member and during subsequent simultaneous movement of said primary shoe member together with said secondary shoe member toward said frontal crossmember, said hydraulic cylinder means being operative to move said primary shoe member along said primary shoe movement path from said primary shoe starting position toward said primary shoe final position to be brought into abutment with respect to said secondary shoe member positioned at said secondary shoe starting position for initiating movement thereof toward said secondary shoe final position to facilitate more rapid movement of a container onto said upper support surface on a roll-off vehicle, said longitudinally extensive member is operative responsive to longitudinal extension thereof to urge movement of said primary shoe member and said secondary shoe member longitudinally along said frame means away from said base crossmember and toward said frontal crossmember;

G. a first base sheave means rotatably mounted with respect to said base crossmember;

H. a second base sheave means also being rotatably mounted with respect to said base crossmember;

I. a primary shoe sheave means rotatably mounted with respect to said primary shoe member and movable therewith along said primary shoe movement path between said primary shoe starting position and said primary shoe final position;

J. a secondary shoe sheave means rotatably mounted with respect to said secondary shoe member and movable therewith along said secondary shoe movement path between said secondary shoe starting position and said secondary shoe final position;

K. a frontal sheave means rotatably mounted with respect to said frontal crossmember;

L. a flexible line means secured to said frame means and extending outwardly therefrom around said primary shoe sheave means and then around said first base sheave means and then around said secondary shoe sheave means and then around said second base sheave means and then around said frontal sheave means and then attached to a container to facilitate loading thereof upon said upper support surface of a roll-off vehicle;

M. a secondary shoe stop means secured to said main frame means and adapted to prevent movement of said secondary shoe member longitudinally along said main frame means from said secondary shoe starting position toward said base crossmember and to allow movement of said secondary shoe member toward said secondary shoe final position and also allowing movement of said primary shoe member therepast between said primary shoe starting position and said primary shoe final position, said secondary shoe stop means defining the location of said secondary shoe starting position immediately thereadjacent, said secondary shoe stop means being secured to said main frame means at a position between said primary shoe starting position and said primary shoe final position and adjacent said secondary shoe starting position, said secondary shoe stop means allowing full freedom of movement of said primary shoe member therepast between said primary shoe starting position and said primary shoe final position, said secondary shoe stop means being secured to said first frame rail means and to said second frame rail means extending inwardly therefrom for selective engagement with respect to said secondary shoe member, said secondary stop means being positioned out of engagement with respect to said primary shoe member during movement thereof along said primary shoe movement path; and N. a base axle means fixedly secured to said base crossmember and extending outwardly therefrom to receive said first base sheave means rotatably mounted thereupon, said base axle means also being adapted to receive said second base sheave means rotatably mounted thereupon.

* * * * *